United States Patent
Huergo Wagner et al.

(10) Patent No.: US 11,893,154 B2
(45) Date of Patent: *Feb. 6, 2024

(54) SYSTEMS, METHODS, AND GRAPHICAL USER INTERFACES FOR UPDATING DISPLAY OF A DEVICE RELATIVE TO A USER'S BODY

(71) Applicant: Apple Inc., Cupertino, CA (US)

(72) Inventors: Alfred B. Huergo Wagner, Redwood City, CA (US); Seung Wook Kim, San Jose, CA (US); Felipe Bacim De Araujo E Silva, San Jose, CA (US); William A. Sorrentino, III, Mill Valley, CA (US); Thomas S. Hulbert, Tigard, OR (US); Karlin Y. Bark, San Carlos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/107,385

(22) Filed: Feb. 8, 2023

(65) Prior Publication Data

US 2023/0185375 A1    Jun. 15, 2023

Related U.S. Application Data

(63) Continuation of application No. 17/483,744, filed on Sep. 23, 2021, now Pat. No. 11,579,693.

(Continued)

(51) Int. Cl.
*G06F 3/0346* (2013.01)
*G06F 3/01* (2006.01)

(52) U.S. Cl.
CPC ............ *G06F 3/013* (2013.01); *G06F 3/0346* (2013.01)

(58) Field of Classification Search
None
See application file for complete search history.

(56) References Cited

U.S. PATENT DOCUMENTS

| 11,107,195 B1* | 8/2021 | Cordes ................... A63F 13/50 |
| 2008/0150921 A1* | 6/2008 | Robertson ............. G06F 3/0346 345/204 |

(Continued)

OTHER PUBLICATIONS

Anonymous, "Display Systems Research: Reverse Passthrough VR", https://research.faceboo.com/blog/2021/08/display-systems-research-reverse-passthrough-vr, Aug. 2, 2021, 10 pages.

(Continued)

*Primary Examiner* — Parul H Gupta
(74) *Attorney, Agent, or Firm* — Morgan, Lewis & Bockius LLP

(57) ABSTRACT

An electronic device, while the electronic device is worn over a predefined portion of the user's body, displays, via a display generation component arranged on the electronic device opposite the predefined portion of the user's body, a graphical representation of an exterior view of a body part that corresponds to the predefined portion of the user's body. The electronic device detects a change in position of the electronic device with respect to the predefined portion of the user's body. The electronic device, in response to detecting the change in the position of the electronic device with respect to the predefined portion of the user's body, modifies the graphical representation of the exterior view of the body part that corresponds to predefined portion of the user's body in accordance with the detected change in position of the electronic device with respect to the predefined portion of the user's body.

46 Claims, 16 Drawing Sheets

Related U.S. Application Data

(60) Provisional application No. 63/083,911, filed on Sep. 26, 2020.

(56) References Cited

U.S. PATENT DOCUMENTS

| | | | |
|---|---|---|---|
| 2017/0310956 A1* | 10/2017 | Perdices-Gonzalez | G09G 3/32 |
| 2018/0004478 A1* | 1/2018 | Chen | G06F 3/1454 |
| 2021/0127046 A1* | 4/2021 | Kamm | G01J 3/0248 |
| 2022/0100271 A1 | 3/2022 | Hulbert et al. | |

OTHER PUBLICATIONS

Chan, "FrontFace Facilitating Communication Between HMD Users and Outsiders Using Front-Facing_Screen HMDs", Proceedings of the 2017 ACM on Conference on Information and Knowledge Management, ACMPUB27, New York, NY, Sep. 4, 2017, 4 pages.

Hamilton, "Google Can Recreate Your Face for Better Mixed Reality Footage", https://uploadvr.com/google-is-recreating-faces-now, Feb. 21, 2017, 7 pages.

Mai et al., "TransparentHMD: Revealing the HMD User's Face to Bystanders", https://eprints.gla.ac.uk/170217/1/170217, Nov. 26, 2017, 6 pages.

Matsuda et al, "Reverse Pass-Through VR", Proceedings of the 17th ACM Conference on International Computing Education Research, ACMPub27, New York, NY, Aug. 5, 2021, 4 pages.

Office Action, dated Jun. 8, 2022, received in U.S. Appl. No. 17/483,744, 20 pages.

Notice of Allowance, dated Oct. 5, 2022, received in U.S. Appl. No. 17/483,744, 8 pages.

International Search Report and Written Opinion, dated Jan. 25, 2022, received in International Patent No. PCT/US2021/052047, which corresponds with U.S. Appl. No. 17/483,744, 60 pages.

* cited by examiner

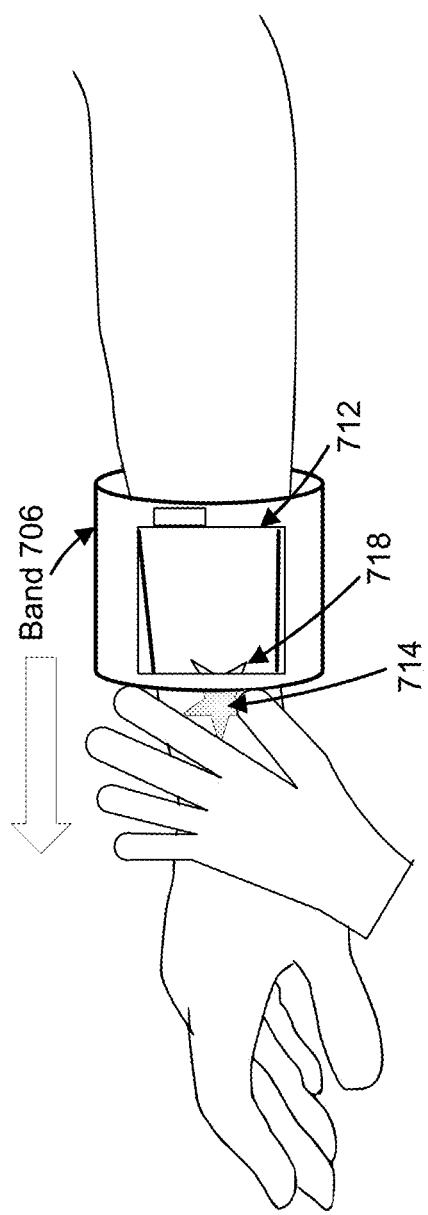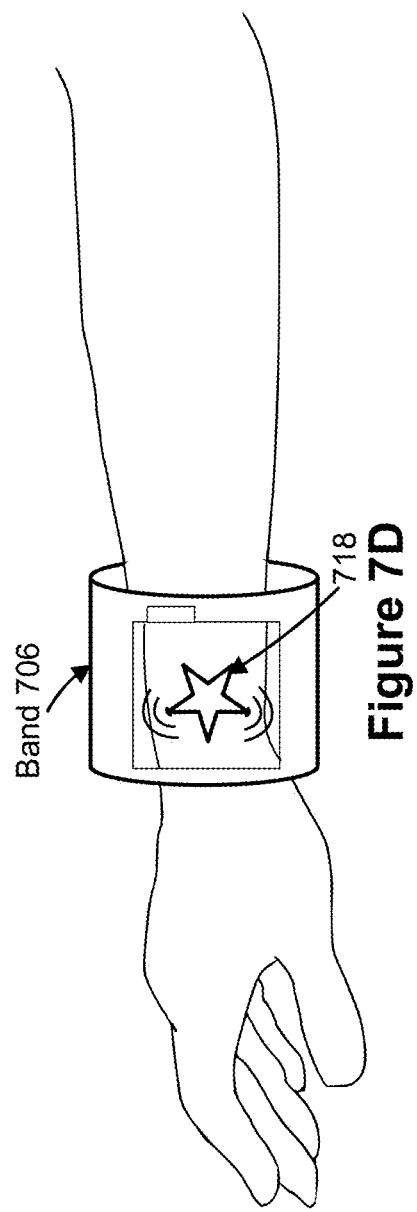

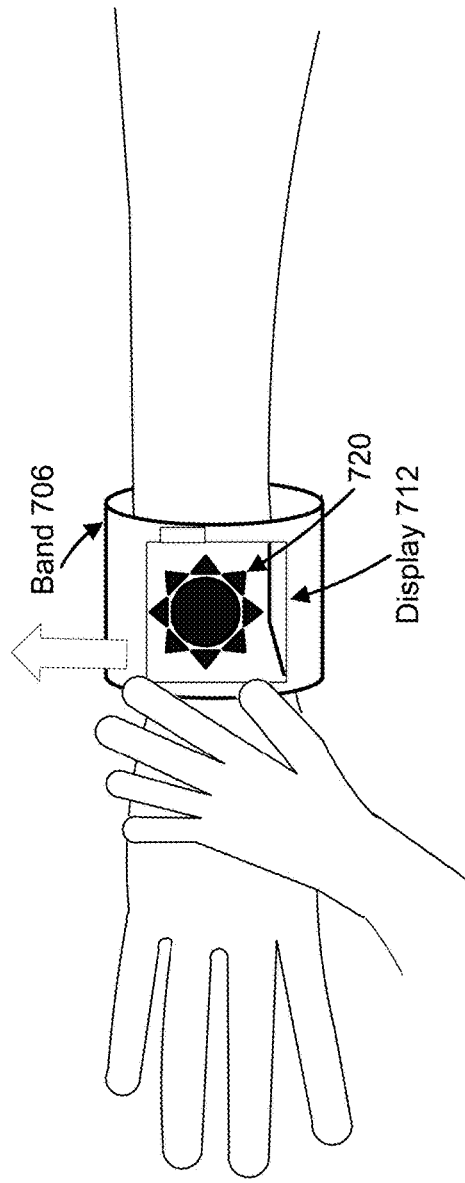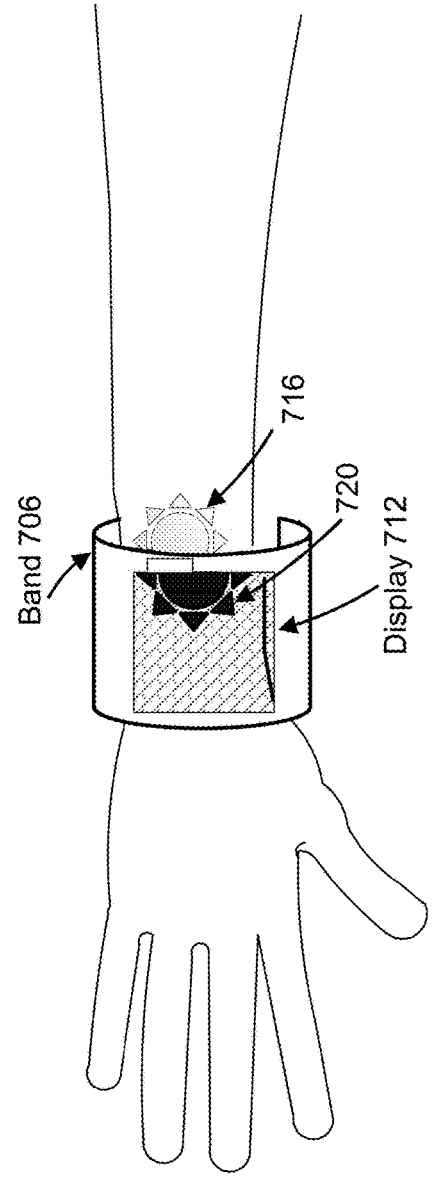

~ 800

816 Modifying the graphical representation of the exterior view of the body part that corresponds to the predefined portion of the user's body in accordance with the detected change in the position of the electronic device with respect to the predefined portion of the user's body includes obscuring at least a portion of the graphical representation of the exterior view of the body part that corresponds to the predefined portion of the user's body

818 Obscuring the graphical representation of the exterior view of the body part that corresponds to the predefined portion of the user's body includes fading out at least a portion of the graphical representation of the exterior view of the body part that corresponds to the predefined portion of the user's body

820 Obscuring the graphical representation of the exterior view of the body part that corresponds to the predefined portion of the user's body includes blurring at least a portion of the graphical representation of the exterior view of the body part that corresponds to the predefined portion of the user's body

822 Obscuring the graphical representation of the exterior view of the body part that corresponds to the predefined portion of the user's body includes vignetting the graphical representation of the exterior view of the body part that corresponds to the predefined portion of the user's body

824 Prior to the user wearing the electronic device, while the user is putting on the electronic device, display the graphical representation of the exterior view of the body part that corresponds to the predefined portion of the user's body

826 At a predefined distance away from the predefined portion of the user's body, initiate display of the graphical representation of the exterior view of the body part that corresponds to the predefined portion of the user's body

828 Detect a second change in position of the electronic device with respect to the predefined portion of the user's body. The second change in the position of the electronic device is toward the predefined portion of the user's body.

In response to detecting the second change in the position of the electronic device with respect to the predefined portion of the user's body, gradually, over time or in accordance with progress of the change in position toward the predefined portion of the user's body, modify the graphical representation of the exterior view of the body part that corresponds to the predefined portion of the user's body in accordance with the second change in the position of the electronic device with respect to the predefined portion of the user's body

---

830 Modifying the graphical representation of the exterior view of the body part that corresponds to the predefined portion of the user's body in accordance with the second change in the position of the electronic device with respect to the predefined portion of the user's body includes modifying the graphical representation of the exterior view of the body part that corresponds to the predefined portion of the user's body to include graphical representations of a greater number of anatomical features as the electronic device is moved toward the predefined portion of the user's body

---

832 Modifying the graphical representation of the exterior view of the body part that corresponds to the predefined portion of the user's body in accordance with the second change in the position of the electronic device with respect to the predefined portion of the user's body includes fading in at least a portion of the graphical representation of the exterior view of the body part that corresponds to the predefined portion of the user's body

---

834 Modifying the graphical representation of the exterior view of the body part that corresponds to the predefined portion of the user's body in accordance with the second change in the position of the electronic device with respect to the predefined portion of the user's body includes decreasing a blur of at least a portion of the graphical representation of the exterior view of the body part that corresponds to the predefined portion of the user's body

---

836 Modifying the graphical representation of the exterior view of the body part that corresponds to the predefined portion of the user's body in accordance with the second change in the position of the electronic device with respect to the predefined portion of the user's body includes reducing a vignetting effect of the graphical representation of the exterior view of the body part that corresponds to the predefined portion of the user's body

838 The predefined portion of the user's body comprises two eyes

---

840 The detected change in position of the electronic device with respect to the predefined portion of the user's body is a first change in position of the electronic device with respect to the predefined portion of the user's body.

Detect a second change in the position of the electronic device with respect to the predefined portion of the user's body, wherein the second change in the position of the electronic device with respect to the predefined portion of the user's body is opposite the first change.

In response to the second change in the position of the electronic device with respect to the predefined portion of the user's body, reverse, over a period of time or in accordance with progress of the second change in position away from the predefined portion of the user's body, the modification of the graphical representation of the exterior view of the body part that corresponds to the predefined portion of the user's body

---

842 In accordance with a determination that the change in position of the electronic device with respect to the predefined portion of the user's body is along a first direction, modify the graphical representation in a first manner.

In accordance with a determination that the change in position of the electronic device with respect to the predefined portion of the user's body is along a second direction, wherein the second direction is distinct from the first direction, modify the graphical representation in a second manner, different from the first manner

---

844 In accordance with a determination that the change in position of the electronic device with respect to the predefined portion of the user's body has a component along the first direction and a component along the second direction, modify the graphical representation in the first manner based on the component along the first direction.

Modify the graphical representation in the second manner based on the component along the second direction

---

846 In accordance with a determination that the change in position of the electronic device with respect to the predefined portion of the user's body is a rotation of the electronic device with respect to the predefined portion of the user's body, modify the graphical representation in a third manner

SYSTEMS, METHODS, AND GRAPHICAL USER INTERFACES FOR UPDATING DISPLAY OF A DEVICE RELATIVE TO A USER'S BODY

RELATED APPLICATIONS

This application is a continuation of U.S. patent application Ser. No. 17/483,744, filed Sep. 23, 2021, which claims priority to U.S. Provisional Patent Application 63/083,911, filed Sep. 26, 2020, both of which are incorporated by reference in its entirety.

TECHNICAL FIELD

This relates generally to computer systems with a display generation component and one or more input devices that provide computer generated experiences, including but not limited to electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for providing computer generated experiences to users that make interaction with the computer systems more efficient and intuitive for a user. Such methods and interfaces optionally complement or replace conventional methods for providing computer generated reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems with a display generation component and one or more input devices are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through stylus and/or finger contacts and gestures on the touch-sensitive surface, movement of the user's eyes and hand in space relative to the GUI or the user's body as captured by cameras and other movement sensors, and voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

There is a need for electronic devices with improved methods and interfaces for interacting with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface.

In accordance with some embodiments, a method is performed at an electronic device configured to be worn over a predefined portion of a user's body, the electronic device having one or more processors, memory, and a display generation component arranged on the electronic device opposite the portion of the user's body. The method includes, while the electronic device is worn over the predefined portion of the user's body, displaying, via the display generation component, a graphical representation of an exterior view of a body part that corresponds to the predefined portion of the user's body. The method further includes, detecting a change in position of the electronic device with respect to the predefined portion of the user's body. The method includes, in response to detecting the change in the position of the electronic device with respect to the predefined portion of the user's body, modifying the graphical representation of the exterior view of the body part that corresponds to predefined portion of the user's body in accordance with the detected change in the position of the electronic device with respect to the predefined portion of the user's body.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7B-7J illustrate example user interfaces for updating a display of a device relative to a user's body in accordance with some embodiments.

FIGS. 8A-8D are flow diagrams of a process for providing computer-generated experiences to users that make interaction with the computing systems more efficient and intuitive for a user in accordance with some embodiments.

DESCRIPTION OF EMBODIMENTS

The present disclosure relates to user interfaces for providing a computer generated reality (CGR) experience to a user, in accordance with some embodiments.

The systems, methods, and GUIs described herein improve user interface interactions with virtual/augmented reality environments in multiple ways.

In some embodiments, the systems, methods, and GUIs described herein improve the visual information available to the user and others in the surrounding environment by displaying animated portions of the user's body that are covered by the display. For example, they make it easier to provide computer-generated experiences to users that make interaction with the computing systems more efficient and intuitive for a user and others in the surrounding environment.

FIGS. 1-6 provide a description of example computer systems for providing CGR experiences to users. FIGS. 7A-7J illustrate example user interfaces for providing computer-generated experiences to users that make interaction with the computing systems more efficient and intuitive for a user. FIGS. 8A-8D illustrate a flow diagram of a method of providing computer-generated experiences to users that make interaction with the computing systems more efficient and intuitive for a user. The user interfaces in FIGS. 7A-7J are used to illustrate the processes in FIGS. 8A-8D.

Figure 1:
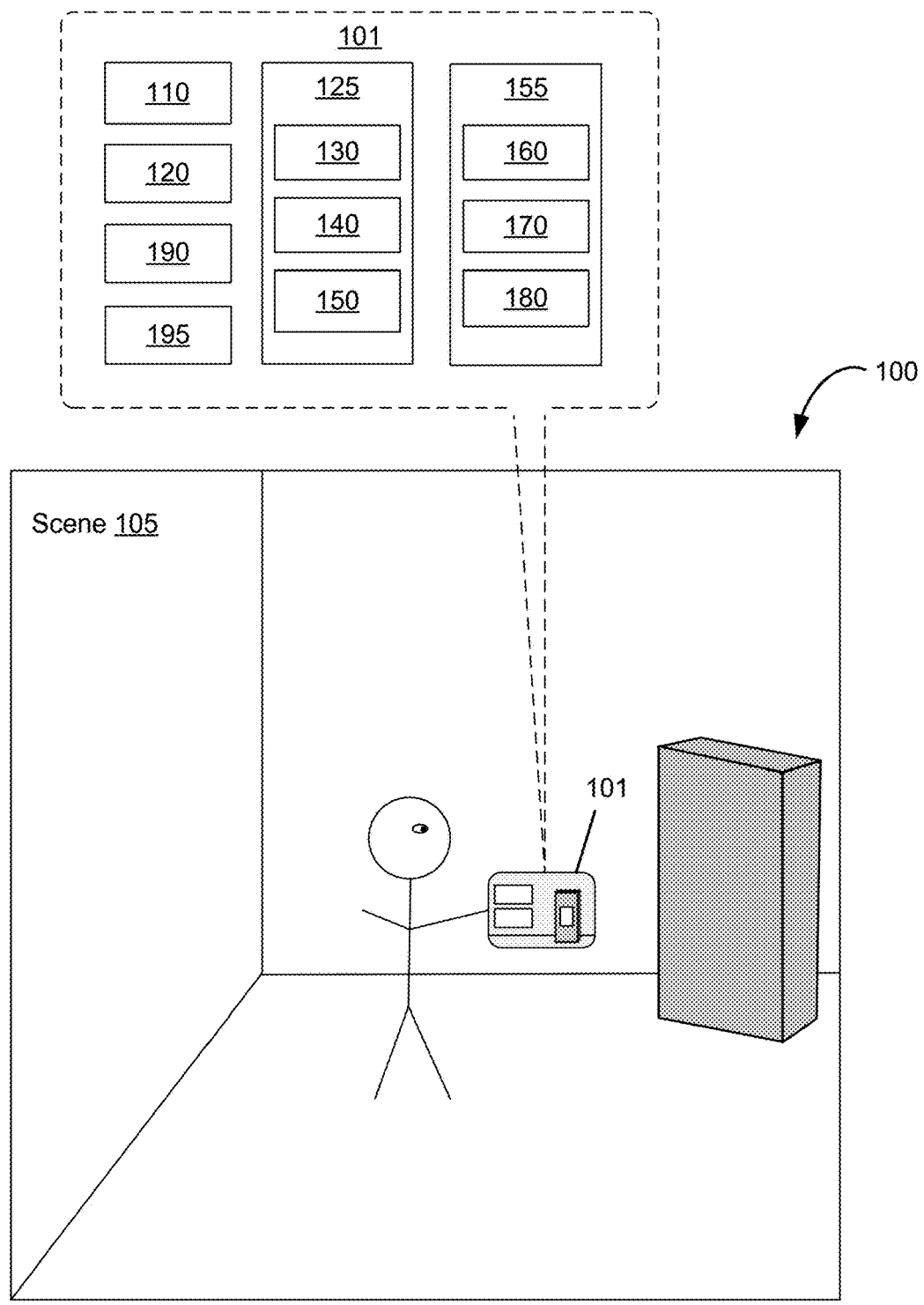
FIG. 1 is a block diagram illustrating an operating environment of a computer system for providing CGR experiences in accordance with some embodiments.

In some embodiments, as shown in FIG. 1, the CGR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a CGR experience, various terms are used to differentially refer to several related but distinct environments that the user may sense and/or with which a user may interact (e.g., with inputs detected by a computer system 101 generating the CGR experience that cause the computer system generating the CGR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a CGR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the CGR experience (e.g., at least a visual component of the CGR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a CGR experience to the user while the user is virtually and/or physically present within the scene 105.

In some embodiments, the display generation component is worn on a part of the user's body (e.g., on his/her head, on his/her hand, etc.). As such, the display generation component 120 includes one or more CGR displays provided to display the CGR content. For example, in various embodiments, the display generation component 120 encloses the field-of-view of the user. In some embodiments, the display generation component 120 is a handheld device (such as a smartphone or tablet) configured to present CGR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a CGR chamber, enclosure, or room configured to present CGR content in which the user does not wear or hold the display generation component 120. Many user interfaces described with reference to one type of hardware for displaying CGR content (e.g., a handheld device or a device on a tripod) could be implemented on another type of hardware for displaying CGR content (e.g., an HMD or other wearable computing device). For example, a user interface showing interactions with CGR content triggered based on interactions that happen in a space in front of a handheld or tripod mounted device could similarly be implemented with an HMD where the interactions happen in a space in front of the HMD and the responses of the CGR content are displayed via the HMD. Similarly, a user interface showing interactions with CRG content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
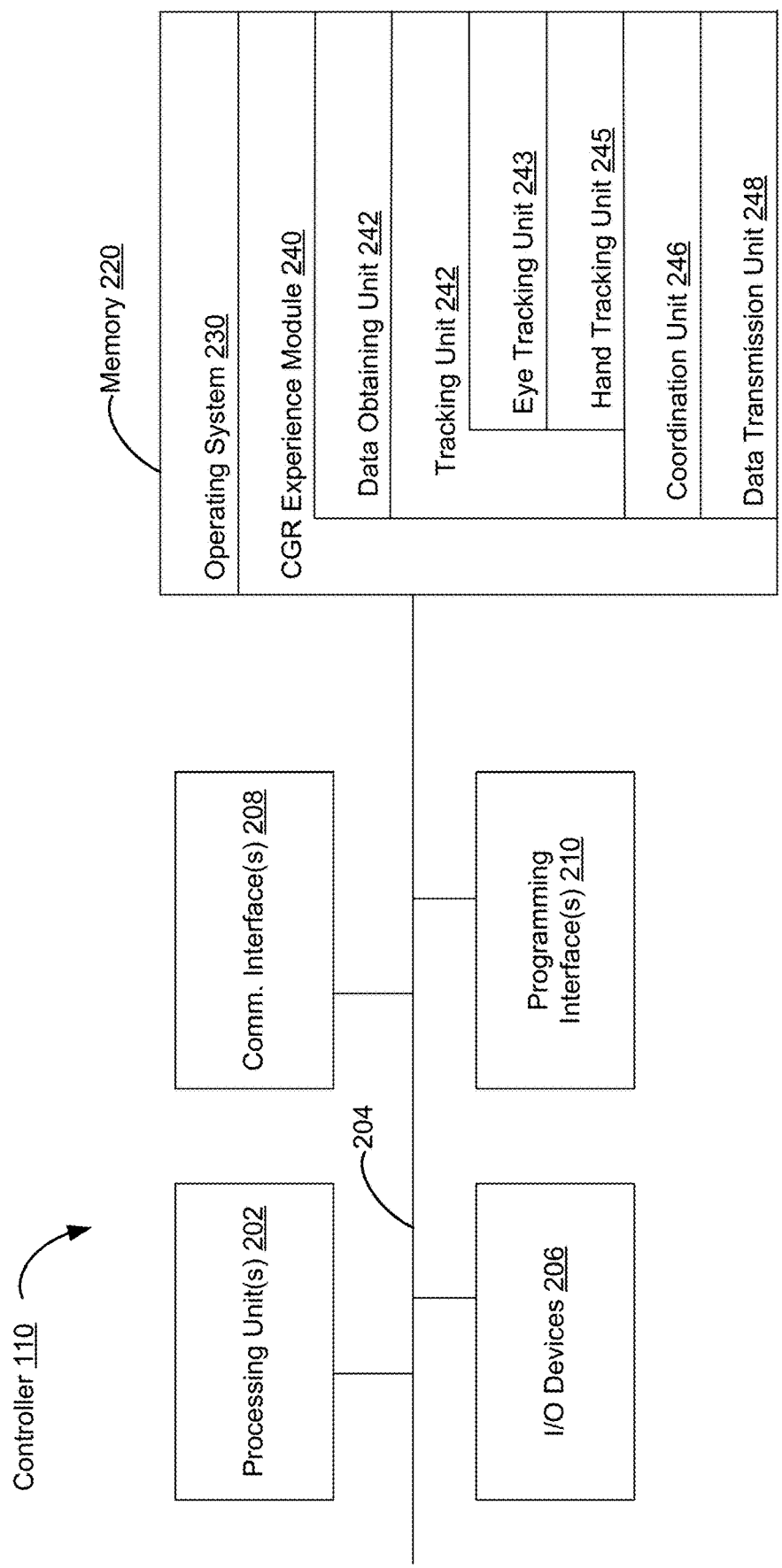
FIG. 2 is a block diagram illustrating a controller of a computer system that is configured to manage and coordinate a CGR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a CGR experience module 240.

The operating system 230 includes instructions for handling various basic system services and for performing hardware dependent tasks. In some embodiments, the CGR experience module 240 is configured to manage and coordinate one or more CGR experiences for one or more users (e.g., a single CGR experience for one or more users, or multiple CGR experiences for respective groups of one or more users). To that end, in various embodiments, the CGR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 245 and/or eye tracking unit 243. In some embodiments, the hand tracking unit 245 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 245 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the CGR content displayed via the display generation component 120. The eye tracking unit 243 is described in greater detail below with respect to FIG. 5.

In some embodiments, the coordination unit 246 is configured to manage and coordinate the CGR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 245), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 245), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
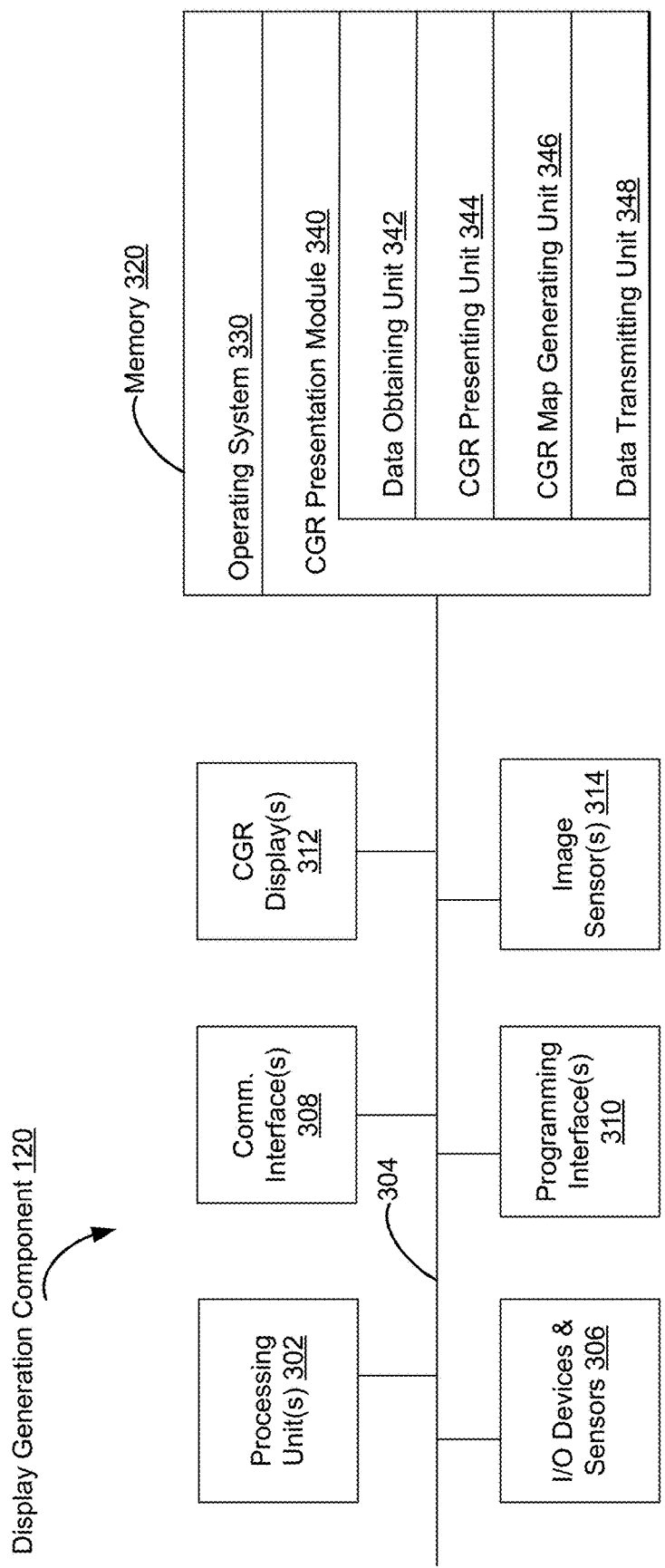
FIG. 3 is a block diagram illustrating a display generation component of a computer system that is configured to provide a visual component of the CGR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., an HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more CGR displays 312 are configured to provide the CGR experience to the user. In some embodiments, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some embodiments, the one or more CGR displays 312 are capable of presenting MR and VR content. In some embodiments, the one or more CGR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a CGR presentation module 340.

The operating system 330 includes instructions for handling various basic system services and for performing hardware dependent tasks. In some embodiments, the CGR presentation module 340 is configured to present CGR content to the user via the one or more CGR displays 312. To that end, in various embodiments, the CGR presentation module 340 includes a data obtaining unit 342, a CGR presenting unit 344, a CGR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the CGR presenting unit 344 is configured to present CGR content via the one or more CGR displays 312. To that end, in various embodiments, the CGR presenting unit 344 includes instructions and/or logic therefor, and heuristics and metadata therefor.

In some embodiments, the CGR map generating unit 346 is configured to generate a CGR map (e.g., a 3D map of the mixed reality scene or a map of the physical environment into which computer generated objects can be placed to generate the computer generated reality) based on media content data. To that end, in various embodiments, the CGR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the CGR presenting unit 344, the CGR map generating unit 346, and the data transmitting unit 348 are shown as residing on a single device (e.g., the display generation component 120 of FIG. 1), it should be understood that in other embodiments, any combination of the data obtaining unit 342, the CGR presenting unit 344, the CGR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
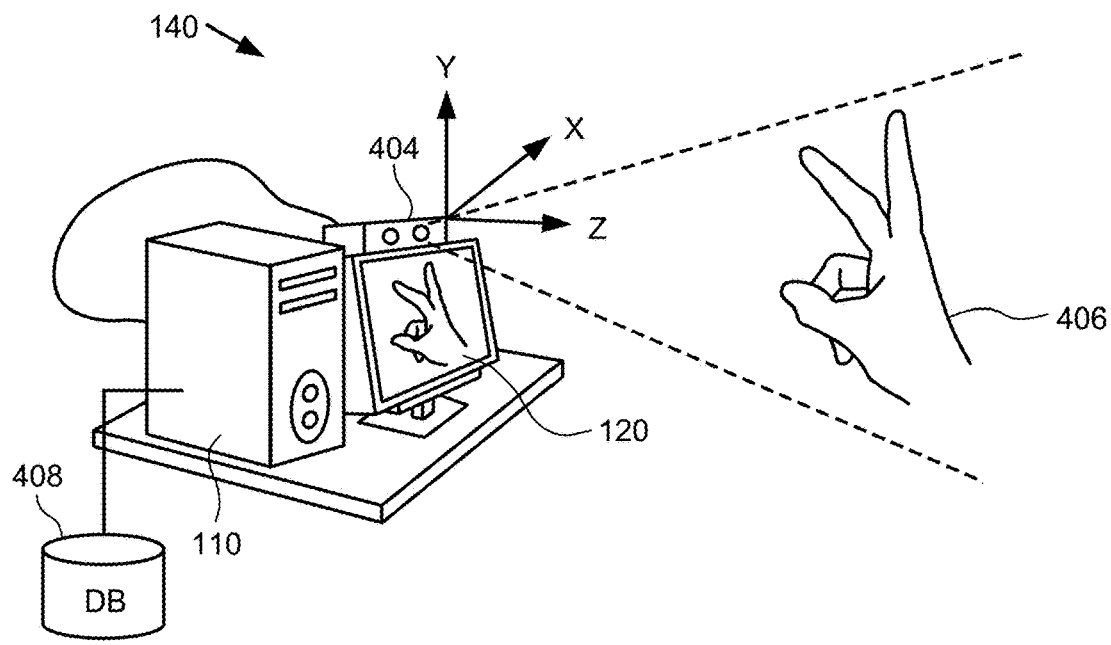
FIG. 4 is a block diagram illustrating a hand tracking unit of a computer system that is configured to capture gesture inputs of the user in accordance with some embodiments.
Figure 4:
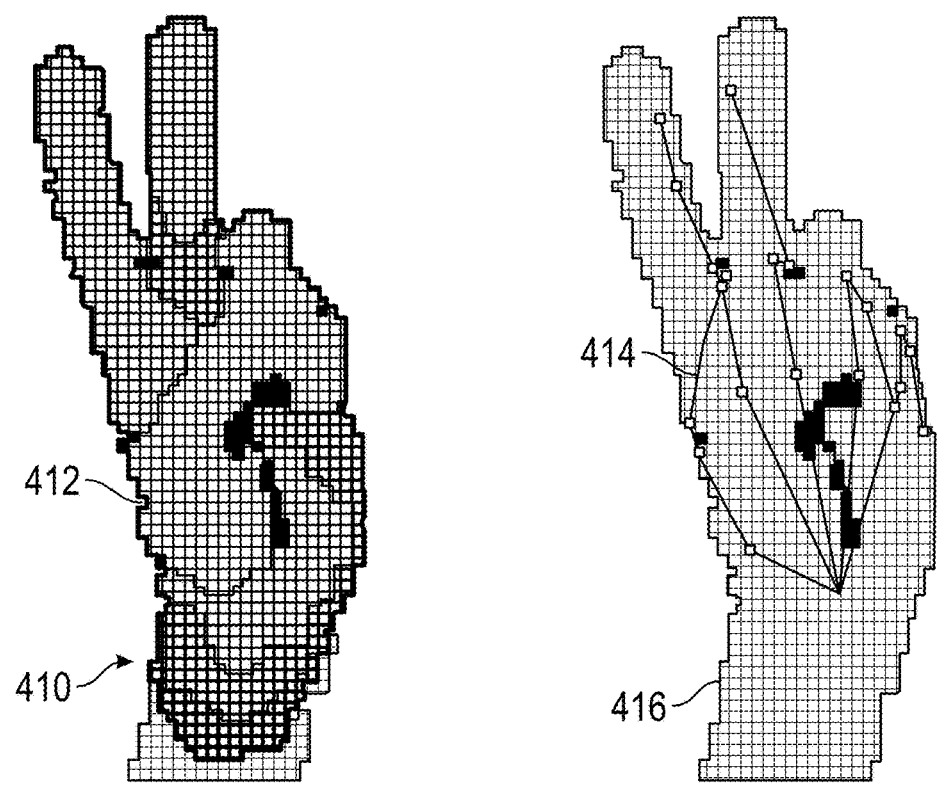

FIG. 4 is a schematic, pictorial illustration of an example embodiment of the hand tracking device 140. In some embodiments, hand tracking device 140 (FIG. 1) is controlled by hand tracking unit 245 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 outputs a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 440 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
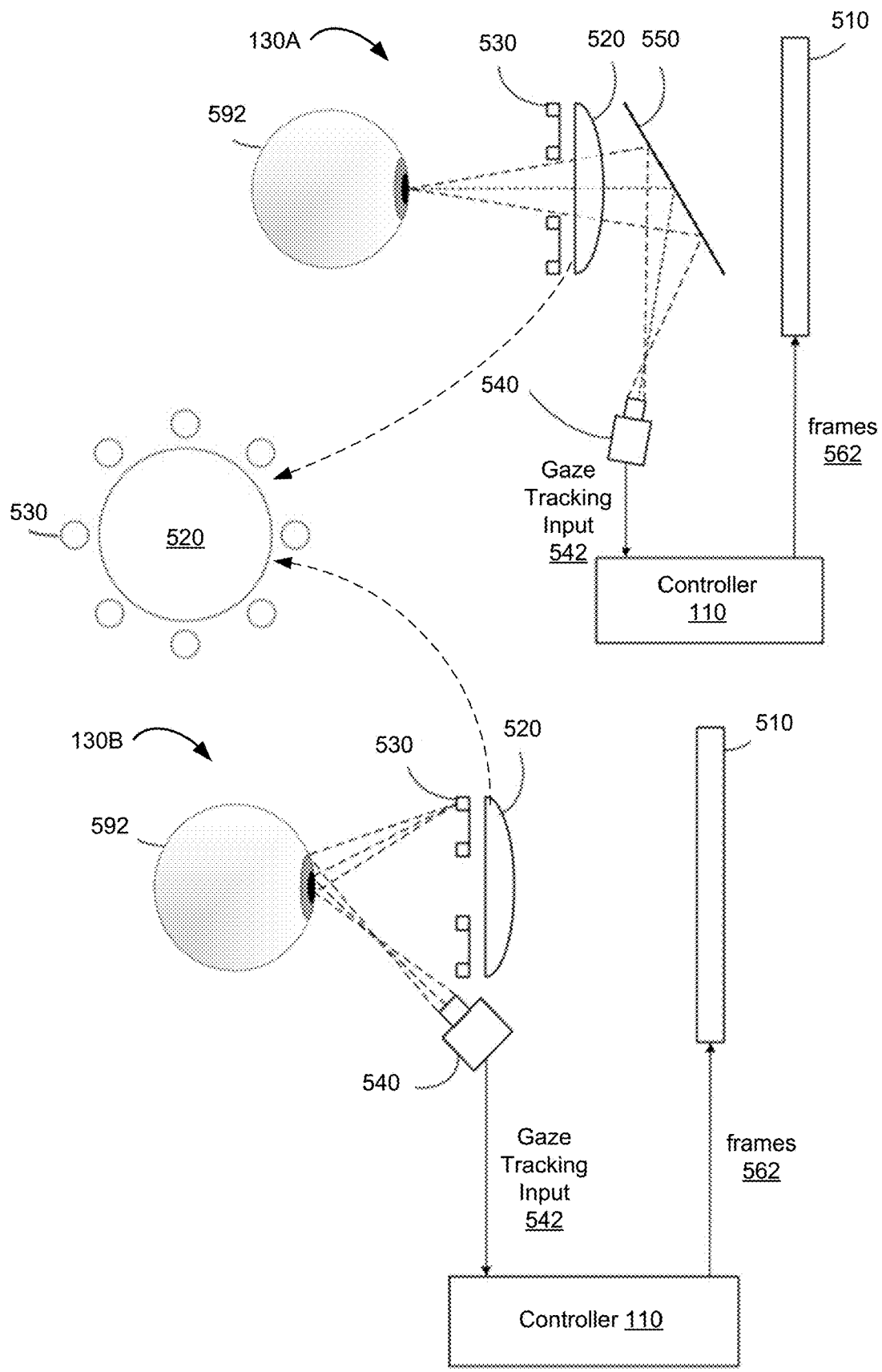
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the CGR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the CGR content for viewing by the user and a component for tracking the gaze of the user relative to the CGR content. In some embodiments, the eye tracking device 130 is separate from the display generation component 120. For example, when display generation component is a handheld device or a CGR chamber, the eye tracking device 130 is optionally a separate device from the handheld device or CGR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the CGR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
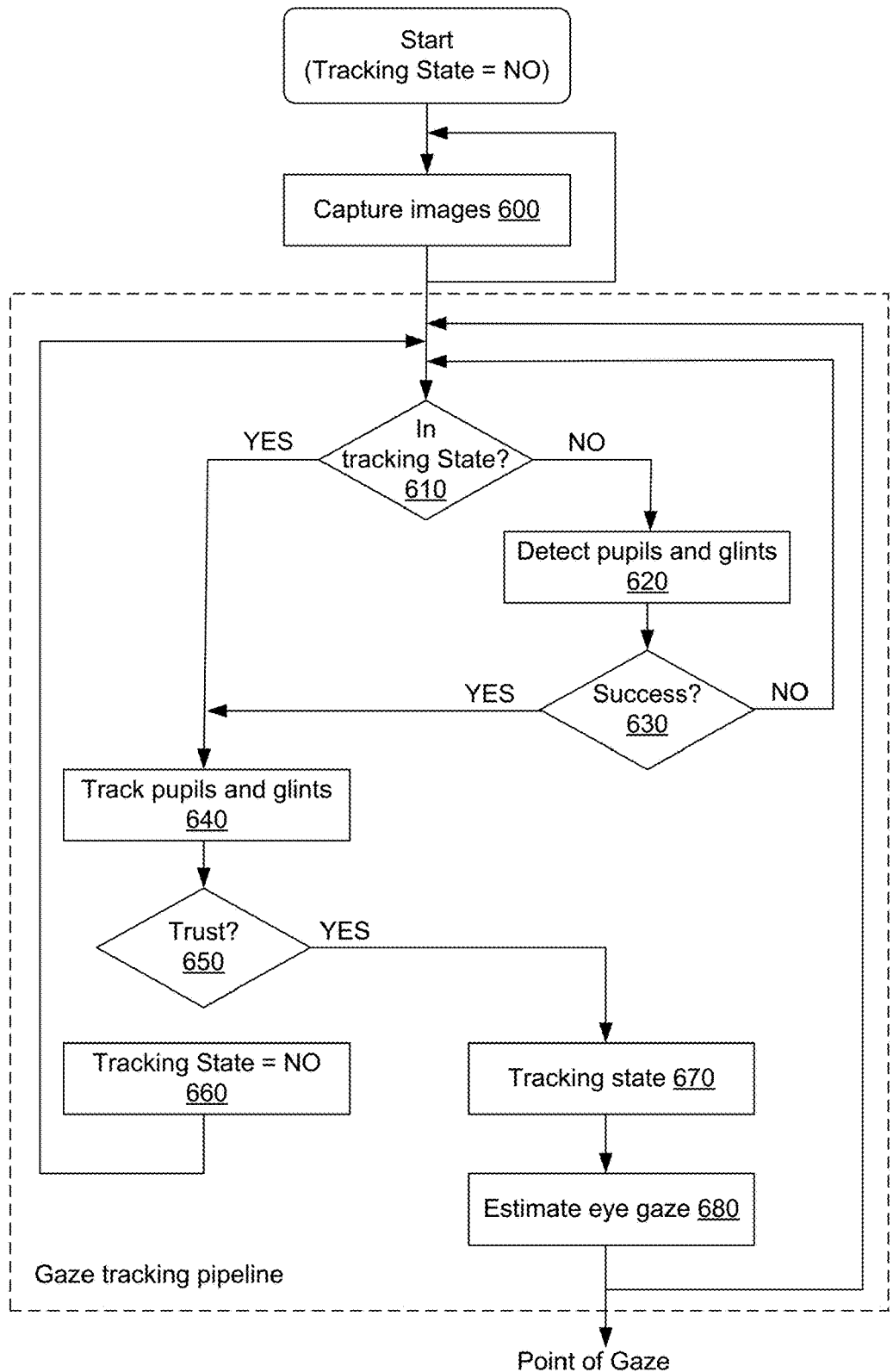
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 410, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serves as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing CGR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7J illustrate example user interfaces for updating a display of a device relative to a user's body in accordance with some embodiments. The user interfaces in these figures are used to illustrate the processes described below, including the processes illustrated in FIGS. 8A-8D.

For convenience of explanation, some of the embodiments will be discussed with reference to operations performed on a device with a touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

Figure 7A:
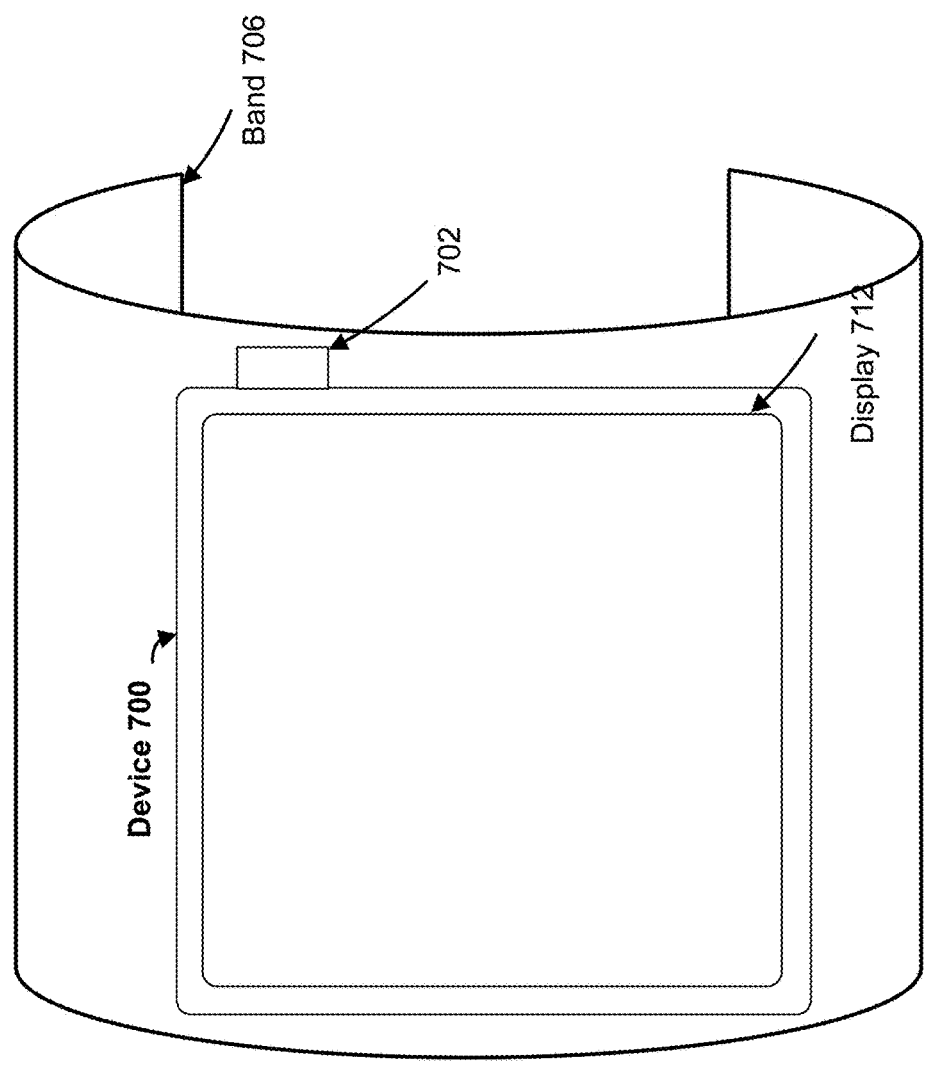
FIG. 7A illustrates a device having a display in accordance with some embodiments.

FIG. 7A illustrates a device having a display in accordance with some embodiments. In some embodiments, device 700 is a computer system 301. In some embodiments, device 700 includes display 712 (e.g., a touch-sensitive display) and side input button 702. In some embodiments, device 700 is a wearable device (e.g., a watch, a headset, etc.). Device 700 is attached to (e.g., worn on) band 706, which is designed to be worn by a user.

Figure 7B:
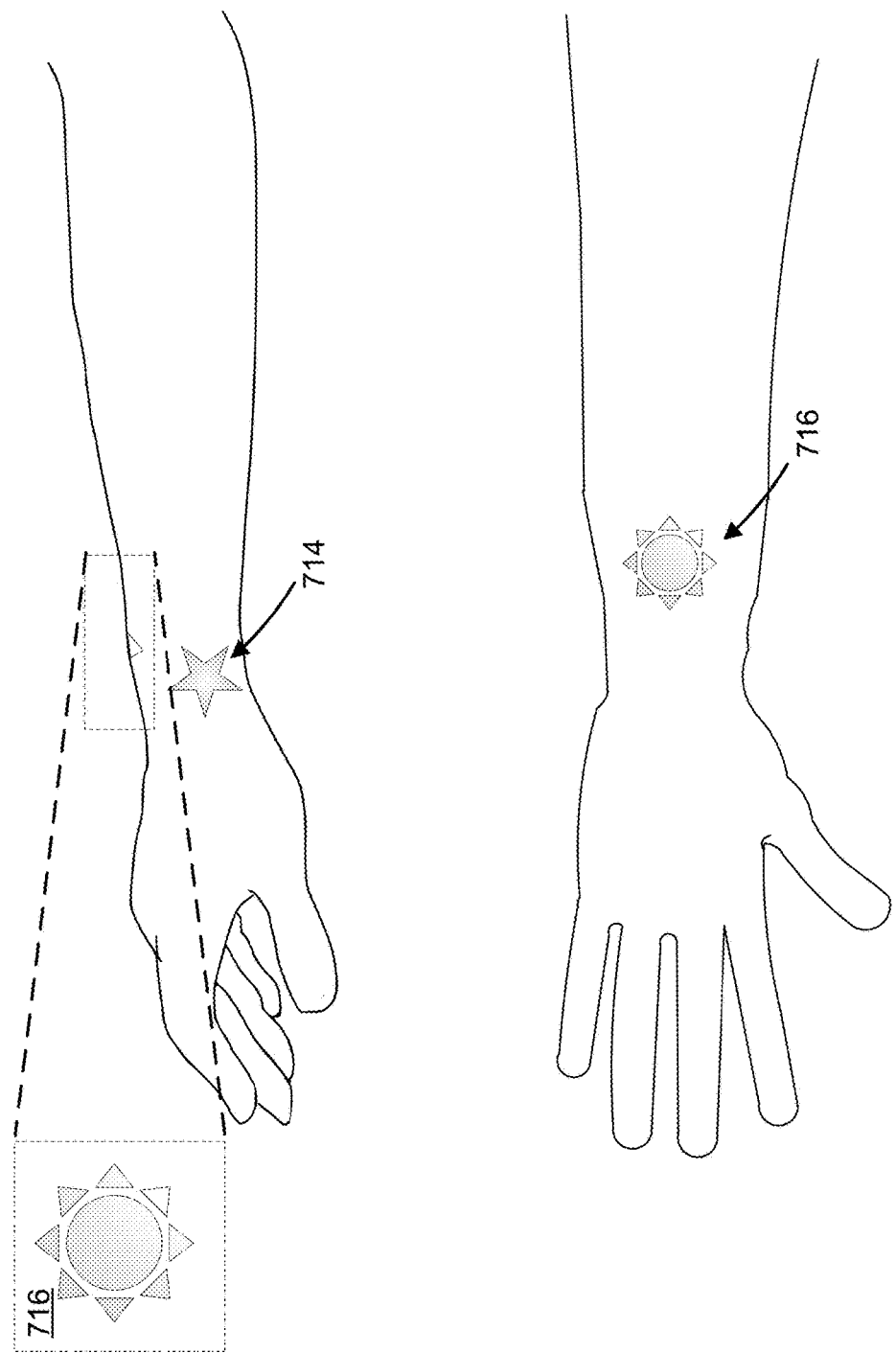

FIGS. 7B-7J illustrate example user interfaces for updating a display of a device relative to a user's body in accordance with some embodiments. FIG. 7B illustrates a user's arm that includes two tattoos: sun tattoo 716 and star tattoo 714. The arm is shown from two different perspectives, including a first perspective from above the arm and a second perspective viewing the inner side of the arm, to illustrate that the tattoos are located on different portions of the arm. In the following descriptions, the tattoos are used to illustrate user interface features based on adjustments to device 700 (e.g., adjustments to the position of device 700) relative to the tattoos. A user need not have a tattoo for device 700 to provide the following user interfaces. For example, the following descriptions apply to any body part, or body feature, of the user (e.g., eyes, eyebrows, hair, face, freckles, etc.) that are covered by the device when worn by the user. Descriptions that refer to a "tattoo" can also refer to any other body part or body feature of the user.

FIG. 7C illustrates band 706, which is attached to or integrated with device 700, worn at a first position on the user's arm. At the first position of the user's arm, device 700 covers a portion of star tattoo 714, and display 712 of device 700 displays a graphical representation of physical features of the user's arm that are covered by device 700. For example, in FIGS. 7C and 7D, displaying the graphical representation includes displaying an animated version of the star tattoo (e.g., a portion of animated star tattoo 718) corresponding to a portion of star tattoo 714 that is covered by device 700. More specifically, in FIG. 7C, a graphical representation of two of the star tips are displayed by device 700 in the approximate location of where the two star tips appear on the arm of the user (e.g., as if the user could see through device 700). In addition to animated star tattoo 718, display 712 also displays a graphical representation of a portion of the user's arm that is covered by device 700. The graphical representation of the user's arm is optionally animated, in which case the display 712 of device 700 displays an animated version of the user's arm. In this way, display 712 displays the portion of the user's arm (e.g., including the portion of star tattoo 714) that is covered by display 712.

In some embodiments, band 706 is adjustable (e.g., movable) after being placed on the user's body. For example, the user moves band 706 to the left (e.g., toward the user's hand), as illustrated by the change from FIG. 7C to FIG. 7D. Band 706 can be adjusted in multiple ways, including moved left, moved right, moved up (e.g., vertically, away from the arm), moved down (e.g., toward the arm), rotated, or any combination of these movements. As band 706 is adjusted (e.g., and device 700 is moved relative to the user's body), the displayed portion of animated star tattoo 718 and the graphical representation of the user's arm is updated to correspond to the current position of device 700. For example, as device 700 is moved to cover a larger portion of star tattoo 714, a larger portion of animated star tattoo 718 is displayed.

FIG. 7D illustrates band 706 in a second position on the user's arm, after being moved to the left (e.g., towards the hand) of the first position shown in FIG. 7C. Display 712 is updated to display the new portion of the user's arm that device 700 covers (e.g., the user's wrist). Further, device 700 and its display 712 now completely cover (e.g., overlaps) star tattoo 714. Display 712 displays (e.g., in real time) animated star tattoo 718 at the location where star tattoo 714 is relative to device 700. In some embodiments, one or more visual effects are superimposed on (or applied to) the graphical representation (e.g., animated star tattoo 718) to generate an animation of the graphical representation. For example, the one or more visual effects cause the graphical representation (e.g., animated star tattoo 718) to move, increase in size, rotate, flash, fade, blur, and/or change color. In some embodiments, the animated movement is based on the body part (or body feature) that is covered by the device. For example, if the device covers the user's eyes and/or eyebrows, the animation comprises the eyes moving, blinking, and/or changing focus or gaze direction, and/or the eyebrows moving (e.g., to indicate various facial expressions).

Figure 7E:
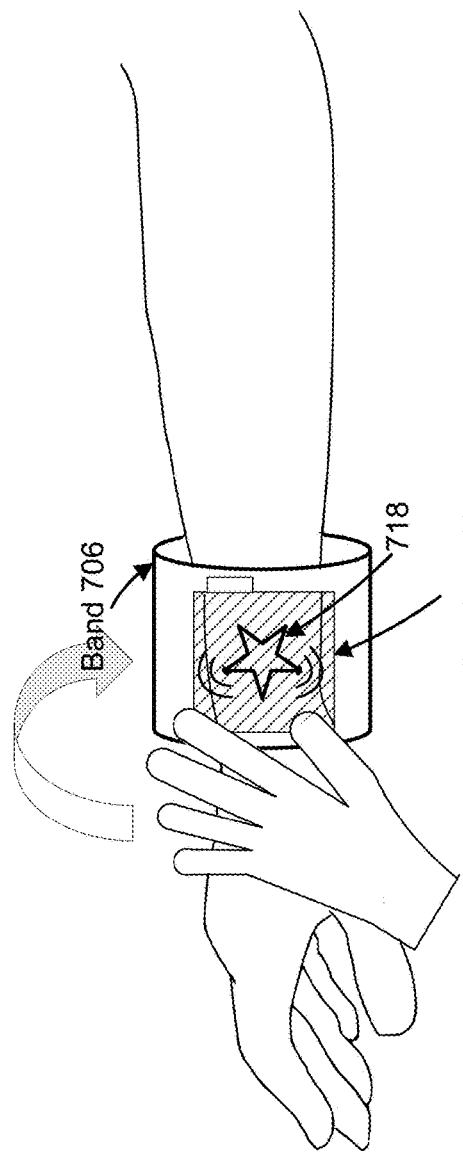

FIG. 7E illustrates the user rotating band 706 to change position of device 700 on the user's body. For example, the user rotates the band so that the display covers the top portion of the user's wrist. In some embodiments, as the user rotates band 706, device 700 continues updating display 712 to display a graphical representation of the portion of the user's body that the device 700 and its display 712 currently cover. In some embodiments, as the user rotates band 706, device 700 generates an animation, such as fading, blurring, or darkening of the display that changes over time (e.g., in an animation), as illustrated by the shading of display 712 in FIG. 7E. In some embodiments, the generated animation is applied to the entire display 712. In some embodiments, the generated animation is applied to a portion of the display (e.g., the portion including animated star tattoo 718). For example, device 700 blurs (or darkens) animated star tattoo 718 on display 712.

Figure 7F:
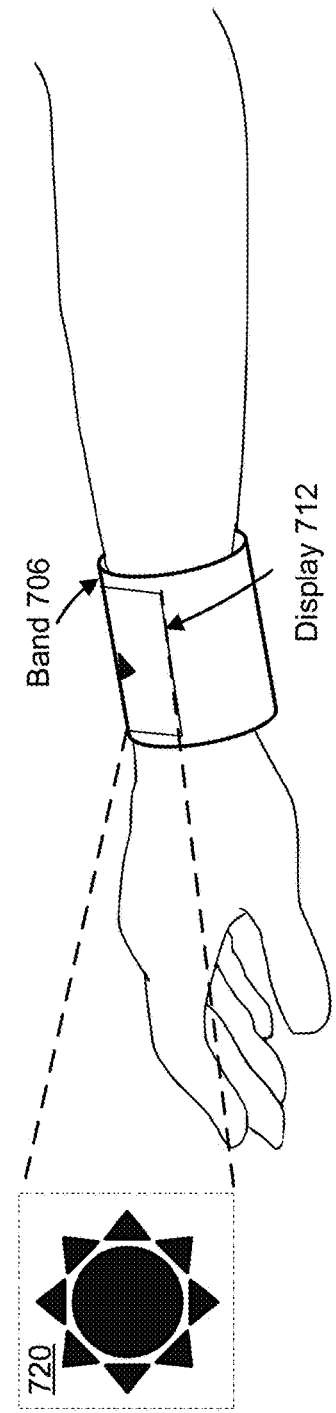

FIG. 7F illustrates band 706 after being rotated into a third position, where display 712 overlaps the portion of the user's body that includes sun tattoo 716. Display 712 is updated to display a graphical representation of sun tattoo 720 and the exterior of the portion of the user's arm underlying device 712; the graphical representation optionally includes an animated sun tattoo 720. In some embodiments, animated sun tattoo 720 is a different color than sun tattoo 716. As described with reference to FIG. 7D, in some embodiments, device 700 animates the tattoo to move, increase in size, rotate, flash, and/or change color on display 712. In some embodiments, the animation of animated sun tattoo 720 is a different animation than the animation of animated star tattoo 718.

FIG. 7G illustrates another perspective, a top view, of display 712 covering the portion of the user's arm that includes sun tattoo 716. From the top view, animated sun tattoo 720 is displayed on display 712. FIG. 7G illustrates the user lifting band 706 away from the user's arm (e.g., to take the band off).

FIG. 7H illustrates device 700 as it is being taken off of the user's body. In some embodiments, in response to lifting band 706 away from the user's arm, display 712 shows an animation (e.g., a different animation than the animation for rotating the band, described in FIG. 7E). As shown in FIG. 7H, movement of device 700 has resulted in only a subset, less than all, of the graphical representation 720 of tattoo 716 being displayed. In another example, different movements of band 706 generate different animations (e.g., based on a direction and an orientation of the movement). For example, as the device is moved away from the user's body (e.g., taken off), the animation comprises a blurring animation of at least a portion of the content currently displayed on display 712. In yet another example, as the device is moved away from the user's body (e.g., taken off), the device gradually obscures at least a portion of the graphical representation of the predefined portion of the user's body (e.g., with an overlay, the properties of which change as the distance between the device and the predefined portion of the user's body changes). As the device is lifted away from the user's arm, display 712 continues updating the portion of animated sun tattoo 720 to correspond to the portion of the user's body that device 700 currently overlaps.

Figure 7I:
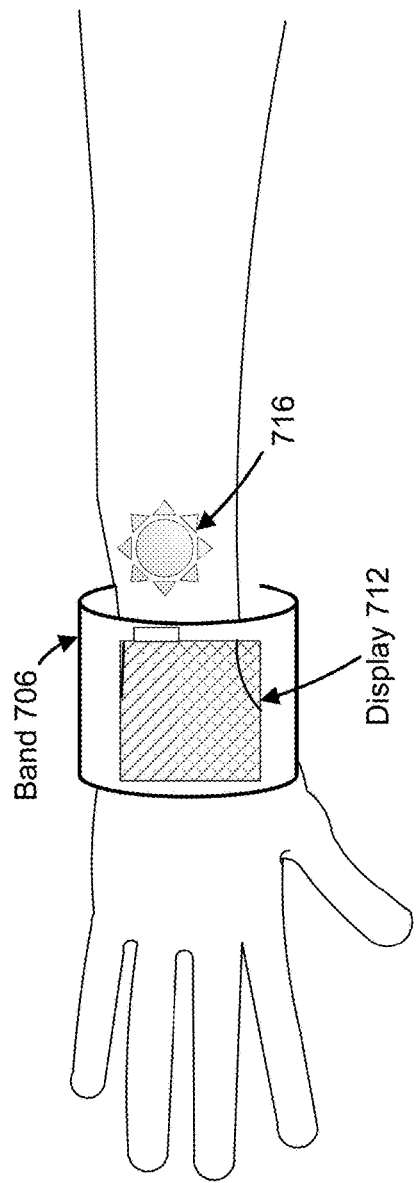

In FIG. 7I, the device 700 continues to be removed from the user's body (e.g., by sliding the device toward the user's hand and pulling the device away from the arm). Display 712 continues to display a graphical representation of the exterior of the portion of the user's body that corresponds to the portion of the user's body that is covered by the device. Device 700 continues to animate display 712 (e.g., by blurring the display), as described with reference to FIG. 7H. As can be seen in FIG. 7I, device 700 no longer overlaps with the portion of the user's arm that includes sun tattoo 716, and therefore display 712 no longer displays a graphical representation that includes animated sun tattoo 720.

Figure 7J:
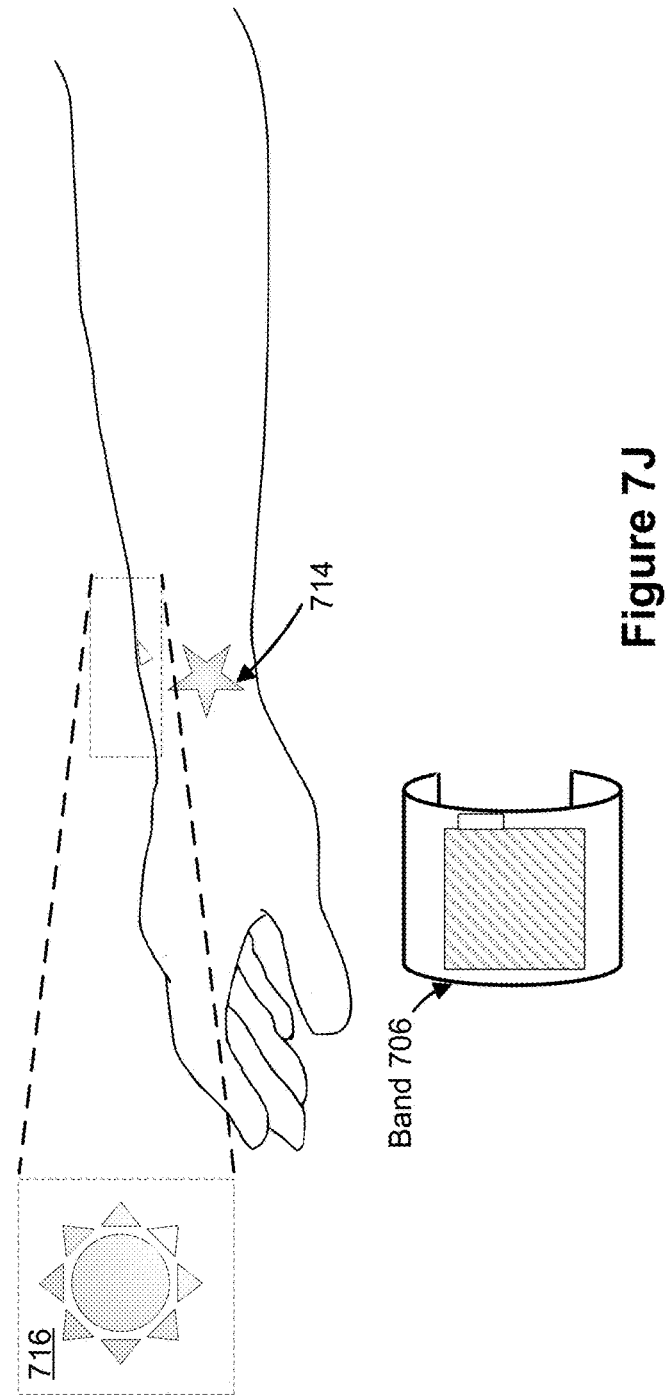
Figure 8A:
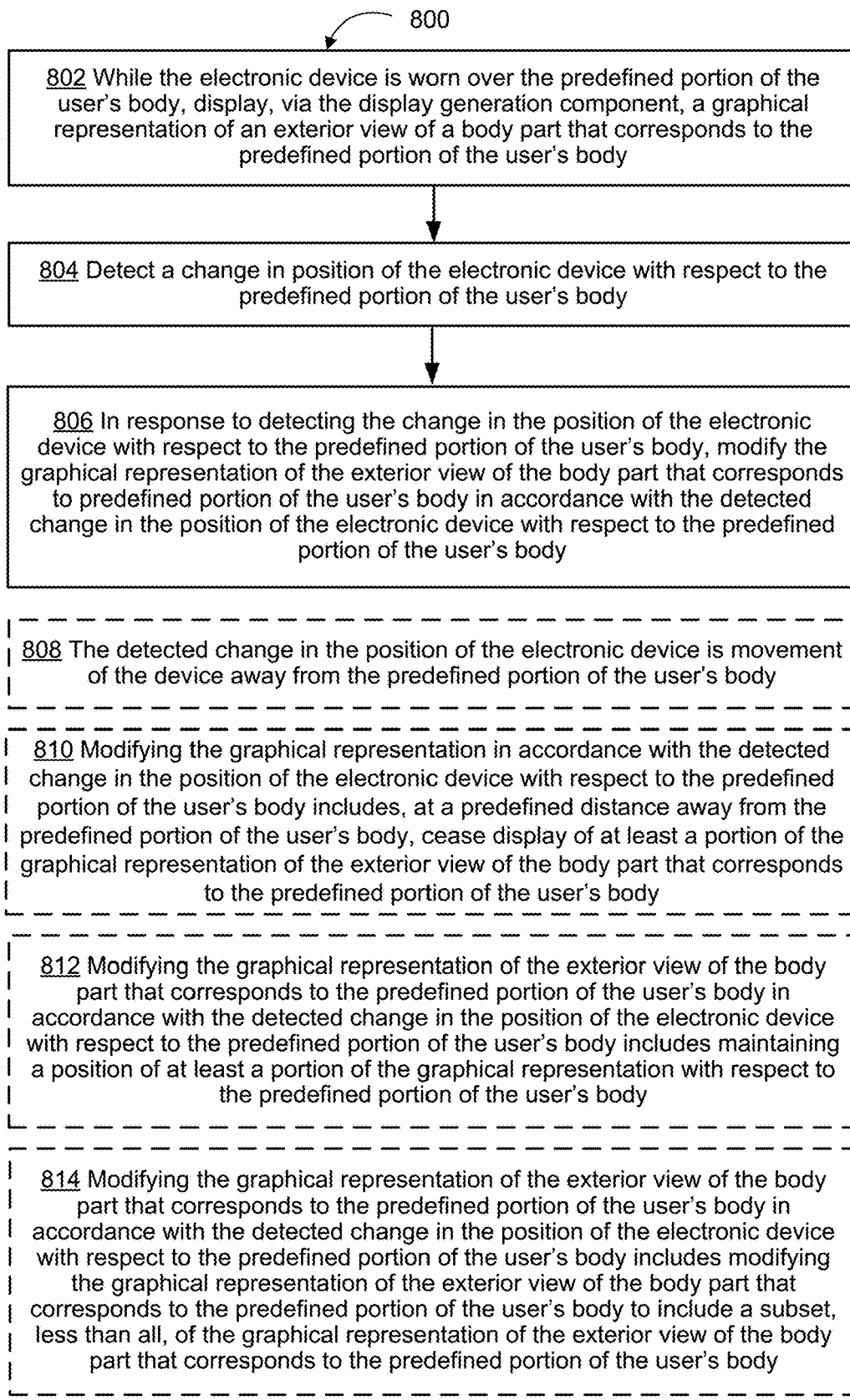

In FIG. 7J, device 700 (e.g., mounted on band 706) has been removed from the user's arm. In some embodiments, in accordance with a determination that device 700 has been removed from the user's body, display 712 is updated. In some embodiments, display 712 darkens (e.g., increases shading, or changes color). In some embodiments, display 712 turns off.

FIGS. 8A-8D are flowcharts of an exemplary method 800 for interacting with a three-dimensional environment using predefined input gestures, in accordance with some embodiments. In some embodiments, the method 800 is performed at a computer system, also referred to as an electronic device or wearable electronic device, (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

As described below, method 800 provides an intuitive way to provide computer-generated experiences to users, to make interaction with the computing systems more efficient and intuitive for a user. The method improves the visual feedback provided while performing actions associated with adjusting the position of devices. For battery-operated electronic devices, making the device appear more responsive to user input conserves power and increases the time between battery charges. The improved visual feedback further enhances the operability of the device (e.g., by helping the user to provide proper inputs and reducing user mistakes when operating/interacting with the device).

In some embodiments, the electronic device is configured to be worn over a predefined portion of a user's body, such as the portion of a user's arm near or adjacent their wrist, or their eyes. In some embodiments, the display generation component of the electronic device is arranged on the electronic device on a side or surface of the device opposite the side of the device closest to the predefined portion of the user's body. For example, in FIGS. 7B-7J, display 712 is arranged on the side or surface of the electronic device opposite the side of the device closest to the portion of the user's arm, facing outward (away from the user's body). While the electronic device is worn over the predefined portion of the user's body, the electronic device displays (802), via the display generation component, a graphical representation of an exterior view of a body part that corresponds to the predefined portion of the user's body.

In some embodiments, the graphical representation is a simulated representation, or facsimile, of the exterior view of the body part that corresponds to the predefined portion of the user's body, which could be a realistically rendered representation of the exterior view of the body part or a caricaturized representation of the exterior view of the body part (e.g., a graphical representation of the exterior view of the body part that intentionally simplifies one or more features of the exterior view of the body part and/or intentionally exaggerates one or more features of the exterior view of the body part). For example, as illustrated in FIGS. 7C-7H, a graphical representation of the exterior portion of the user's arm and tattoos on the user's arm is displayed on device 700. In some embodiments, the graphical representation is animated (e.g., by applying visual effects to the graphical representation on the display). In some embodiments, the predefined portion of the user's body comprises at least a portion of the user's face.

For example, the electronic device is a headset, or head-mounted display (HMD), (e.g., configured to be worn on the user's head) that includes a display generation component facing outward (away from the user's body), and the predefined portion of the user's body includes the user's eyes, eyebrows, nose, mouth, hair, freckles, glasses, and/or any other feature present on the user's face. For example, the display generation component of the HMD displays a graphical representation of the user's eyes (and/or other features) when the HMD is worn over the user's eyes (and/or other features). In some embodiments, the graphical representation of the user's eyes is animated such that the graphical representation of the user's eyes appears to blink (or wink), changes size (e.g., the graphical representation of the user's eyes becomes bigger or smaller), or otherwise animates to indicate different facial expressions (e.g., a graphical representation of the user's eyebrows raises or lowers relative to the position of the graphical representation of the user's eyes).

The electronic device detects (804) a change in position of the electronic device with respect to the predefined portion of the user's body. The electronic device, in response to detecting the change in the position of the electronic device with respect to the predefined portion of the user's body, modifies (806) the graphical representation of the exterior view of the body part that corresponds to predefined portion of the user's body in accordance with the detected change in the position of the electronic device with respect to the predefined portion of the user's body. For example, as illustrated in FIGS. 7C-7H, as device 700 is adjusted (e.g., repositioned) with respect to the user's arm, the graphical representation on display 712 is updated to display the portion of the user's arm and the portion of the tattoo that is currently covered by device 700. In some embodiments, the electronic device detects a change in position of the electronic device with respect to the predefined portion of the user's body using For example, the HMD changes position with respect to the user's eyes in a plurality of circumstances, including: as the user puts the HMD onto the user's head, as the user removes the HMD from the user's head, and as the user adjusts the HMD while the HMD is on the user's head, such as pulling the HMD away from the user's face (and eyes), moving the HMD to the right and left (relative to a neutral position, where the neutral position corresponds to the HMD placed in the predefined position over the user's eyes), and moving the HMD up or down (or any combination of these movements). In some embodiments, in accordance with a determination that the HMD is changing positions in any of these ways, the display generation component on the HMD is updated to modify the graphical representation of the user's eyes that are displayed on the HMD. As described below, the modification to the graphical representation of the user's eyes is based on (e.g., corresponds to) the change in position, or type of adjustment, of the HMD relative to the user's eyes.

Updating a display to show a portion of a user's body that is hidden behind the electronic device provides a more intuitive way for the user, and others in the surrounding environment who view the display, to know where the electronic device is located relative to the user's body, even when that portion of the user's body is covered and not visible to the user (or others in the surrounding environment). This improves the experience of interacting with wearable devices by decreasing the cognitive burden on the user, and others in the surrounding environment, to imagine or guess what is behind the electronic device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the detected change in the position of the electronic device is movement (808) of the device away from the predefined portion of the user's body. For example, FIGS. 7G-7H illustrate device 700 as it is pulled away from the user's arm. In some embodiments, movement of the device away from the predefined portion of the user's body comprises moving the electronic device away from the user's body, without removing the electronic device from the user's body. In some embodiments, the detected change in position begins as a movement of the device away from the predefined portion of the user's body, and, in accordance with a determination that the device is positioned at least a threshold distance away from the user's body, the detected change in position corresponds to removing the device from the user's body.

In accordance with the above example of an HMD configured to be worn over the user's eyes, in some embodiments, the user moves the HMD away from the user's eyes (e.g., pulls the HMD forward, away from the user's face). In some embodiments, the user moves the HMD away from the user's eyes without removing the HMD from the user's head. For example, the user generates more space (e.g., a larger distance) between the user's face and the HMD. In some embodiments, the user pulls the HMD straight away from the user's face (e.g., without moving the HMD to the left, right, up or down, relative to the user's face looking straight forward).

Tracking the movement of the electronic device with respect to the user's body provides a more accurate representation of the portion of the user's body that is hidden by the electronic device. Accurately displaying the representation of the portion of the user's body that is hidden by the electronic device provides an intuitive way for the user, and others in the surrounding environment who view the display, to know where the electronic device is located relative to the user's body, even when the user's body, or at least the aforementioned portion of the user's body, is covered and not visible to the user. This improves the experience of interacting with wearable devices by decreasing the cognitive burden on the user, and others in the surrounding environment, to imagine what is under the electronic device. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, modifying the graphical representation in accordance with the detected change in the position of the electronic device with respect to the predefined portion of the user's body includes (810), at a predefined distance away from the predefined portion of the user's body, ceasing display of at least a portion of (or all of) the graphical representation of the exterior view of the body part that corresponds to the predefined portion of the user's body. For example, as illustrated in FIG. 7J, display 712 ceases displaying a graphical representation of the user's arm as the device has moved away (e.g., at least a predefined distance) from the user's arm. For example, as explained above, when the change in position corresponds to removing the device from the user's body after the device has been moved away by at least a threshold amount (a predefined distance away from the body), the device ceases displaying at least a portion of the graphical representation of the exterior view of the body part.

In the above example of the HMD configured to be worn over the user's eyes, in some embodiments, the user changes the position of the HMD by removing the HMD from the user's head. In some embodiments, in accordance with a determination that the HMD has been removed a predefined distance away from the user's eyes, the display generation component ceases displaying the graphical representation of the user's eyes.

Ceasing to display the representation of the portion of the user's body when the electronic device has been removed provides an intuitive transition that shows the user, and others in the surrounding environment who view the display, that the electronic device has been removed from the user's body and that the display will no longer display the representation of the portion of the user's body when the device has been removed from the portion of the user's body. This improves the experience of interacting with wearable devices by decreasing the cognitive burden on the user, and others in the surrounding environment, to be aware of a current position of the electronic device relative to the user's body. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, modifying the graphical representation of the exterior view of the body part that corresponds to the predefined portion of the user's body in accordance with the detected change in the position of the electronic device with respect to the predefined portion of the user's body includes (812) maintaining a position of at least a portion of the graphical representation (of the exterior view of the body part that corresponds to the predefined portion of the user's body) with respect to the predefined portion of the user's body. For example, while the position of the electronic device changes, the electronic device maintains a graphic representation of an anatomical feature of the user's body at a same position, relative to that anatomical feature of the user's body (e.g., the graphical representation of the user's eyes or arm is updated or moved so that it remains displayed on the display generation component at a position that covers the anatomical feature). For example, as illustrated in FIGS. 7C-7D, as device 700 is adjusted to different portions of the user's arm, a graphical representation of the portion of the user's arm corresponding to the device's current position is displayed on display 712. As such, as device 700 moves to completely cover star tattoo 714, the animated version of star tattoo 718 is generated and displayed at positions corresponding to the position of star tattoo 714 on the user's arm, and thus the animated version of star tattoo 718 continues to match the position of and cover star tattoo 714 as the device 700 moves.

In accordance with the above example of the HMD configured to be worn over the user's eyes, in some embodiments, as the user moves (e.g., adjusts) the HMD relative to the user's eyes, the display generation component is updated to display the graphical representation of the user's eyes in a position on the display that corresponds to a current position of the user's eyes (that are currently covered by the HMD). For example, as the user moves the HMD to the user's left, the graphical representation of the user's eyes appears (e.g., to a third party that is looking at the display generation component) not to move with the HMD. Instead, the graphical representation of the user's eyes appears to remain in a constant position that corresponds to a location in front of the user's real eyes. Thus, even as the user moves the HMD to different locations on the user's face, the graphical representation of the user's eyes appear, to the third party looking at the display generation component, at the position in which the user's eyes would be seen if the user's eyes were not currently covered by the HMD.

Maintaining a relative position of the features in the graphical representation of the portion of the user's body as the electronic device moves to cover a different portion of the user's body, provides an intuitive way for the user, and others in the surrounding environment who view the display, to know where the electronic device is located relative to the user's body, even when the user's body is covered and not visible to the user. This improves the experience of interacting with wearable devices by decreasing the cognitive burden on the user, and others in the surrounding environment, to imagine what is under the electronic device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, modifying the graphical representation of the exterior view of the body part that corresponds to the predefined portion of the user's body in accordance with the detected change in the position of the electronic device with respect to the predefined portion of the user's body includes (814) modifying (e.g., gradually) the graphical representation of the exterior view of the body part that corresponds to the predefined portion of the user's body to include a subset, less than all, of the graphical representation of the exterior view of the body part that corresponds to the predefined portion of the user's body. An example of such a modification of the graphical representation is shown in FIG. 7H and discussed above with respect to FIG. 7H. In another example, the graphical representation becomes more abstract (e.g., less detailed) as the electronic device changes position relative to the predefined portion of the user's body.

In some embodiments, the graphical representation of the exterior view of the predefined portion of the user's body includes graphical representations (e.g., depictions) of a plurality of anatomical features of the user's body (e.g., eyes, eyebrows, a nose, a mouth, a tattoo). In some embodiments, modifying the displayed graphical representation to include a subset, less than all, of the graphical representation of the predefined portion of the user's body includes reducing a number of the graphical representations of the plurality of anatomical features (e.g., eliminating one or more of the graphical representations of anatomical features in the plurality of anatomical features).

In some embodiments, modifying the displayed graphical representation to include a subset, less than all, of the graphical representation of the predefined portion of the user's body is performed in accordance with a determination that the change in position of the electronic device with respect to the predefined portion of the user's body is along a first direction (away from) the predefined portion of the user's body (e.g., the modifying occurs while the user is taking off the electronic device). For example, the graphical representation shows a less detailed version of the predefined portion of the user's body (with fewer features or less detailed features) as the electronic device is moved away from the user's body.

For example, as the user moves the HMD away from the user's eyes (e.g., pulls the HMD forward, away from the user's face), the graphical representation of the user's eyes includes less detail. For example, when the HMD is placed in its neutral position (e.g., with proper placement on the user's face), the graphical representation includes a graphical representation of the user's eyes and a graphical representation of the user's eyebrows (and/or graphical representations of other features related the user's eyes or of the user's face surrounding the user's eyes). As the HMD is moved farther away from the user's eyes (e.g., by the user pulling the HMD away from the user's face), the graphical representation is updated to become more abstract (e.g., by removing or obscuring one or more features that are in the graphical representation). For example, the graphical representation is updated to forgo display of the graphical representation of user's eyes, such that the modified graphical representation includes only a graphical representation of the user's eyebrows. In another example, the graphical representation is updated to replace the display of the graphical representation of user's eyes with a simplified graphical representation of eyes (e.g., a line drawing of eyes, a two-dimensional representation of eyes instead of a simulated three-dimensional representation of eyes, and/or a mono tone or two tone representation of eyes instead of a representation of eyes with more colors such as 5, 10 or 256 colors).

In some embodiments, the method includes detecting a subsequent change in the position of the electronic device with respect to the predefined portion of the user's body, wherein the subsequent change in the position of the electronic device with respect to the predefined portion of the user's body is opposite the first direction. For example, the subsequent change comprises moving the electronic device closer to the user's body (e.g., putting the electronic device onto the user's body). In some embodiments, the electronic device, in response to the subsequent change in the position of the electronic device with respect to the predefined portion of the user's body, increases the number of graphical representations of anatomical features of the user's body (e.g., reversing the modification(s) of the displayed graphical representation that took place while the user was moving the electronic device away from the predefined portion of the user's body). For example, the graphical representation shows more detail of the predefined portion of the user's body (with more features or more detailed features), as the electronic device is moved closer to the user's body.

For example, after the user has pulled the HMD away from the user's eyes, the user subsequently brings the HMD in the opposite direction (e.g., back towards the user's eyes). As the user moves the HMD closer to the user's face (and eyes), the modified graphical representation that only included the user's eyebrows (and not a graphical representation of the user's eyes) is updated to increase the level of detail present in the modified graphical representation. For example, the modified graphical representation is updated from only displaying the graphical representation of the user's eyebrows, to displaying the graphical representation the includes the user's eyes and the user's eyebrows, as the user moves the HMD closer to the user's face.

Gradually displaying a less (or more) detailed representation of the predefined portion of the user's body visually indicates whether the electronic device is moving farther away from (or closer to) the user's body, which provides an intuitive way for the user, and others in the surrounding environment who view the display, to know how close the electronic device is located to the user's body, even when the predefined portion of the user's body is covered and not visible to the user. This improves the experience of interacting with wearable devices by decreasing the cognitive burden on the user, and others in the surrounding environment, to imagine what is under the electronic device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, modifying the graphical representation of the exterior view of the body part that corresponds to the predefined portion of the user's body in accordance with the detected change in the position of the electronic device with respect to the predefined portion of the user's body includes (816) obscuring at least a portion of the graphical representation of the exterior view of the body part that corresponds to the predefined portion of the user's body. For example, as discussed above with reference to FIGS. 7G-7H, as device 700 changes position with respect to the user's arm (e.g., is moved away from the user's arm), display 712 obscures (e.g., with an overlay) the graphical representation of the user's arm and animated sun tattoo 720, shown in FIG. 7H. Optionally, one or more visual properties (e.g., one or more of blurring, brightness, saturation, contrast, etc.) of the obscuring change as the distance between the device and the predefined portion of the user's body changes.

In some embodiments, the obscuring of the displayed graphical representation is performed in accordance with a determination that the change in position of the electronic device with respect to the predefined portion of the user's body is along a second direction away from the predefined portion of the user's body (e.g., different from the first direction).

For example, as explained above, as the user moves the HMD away from the user's face by pulling the HMD straight away from the face (e.g., without moving the HMD to the left, right, up or down), the graphical representation is updated to show less detail. In some embodiments, as the user moves the HMD in another direction, such as up (e.g., as if the HMD will be placed on the user's forehead, above the user's eyes), the graphical representation is modified to display a visual effect applied to the graphical representation. In some embodiments, the modified graphical representation is an obscured version of the graphical representation (e.g., generated by fading, blurring, or vignetting at least a portion of the graphical representation). For example, as the position of the HMD changes by the user moving the HMD upwards, the graphical representation of the user's eyes are blurred. It will be understood that the descriptions that describe generating a particular visual effect in accordance with a respective direction or type of movement are for example only, and that any of the visual effects (or combination of visual effects) described herein may be applied to the graphical representation when the electronic device is moved in any other possible direction. Further, as described with more detail below, movement of the HMD in a plurality of directions (e.g., movement with components in the left, up, and away direction) results in a combination of visual effects, with each visual effect corresponding to a respective direction of movement.

Displaying an obscured view of the representation of the portion of the user's body to indicate that the electronic device is moving with respect to the user's body provides an intuitive way for the user, and others in the surrounding environment who view the display, to know that the electronic device is being adjusted relative to the user's body. This improves the experience of interacting with wearable devices by decreasing the cognitive burden on the user, and others in the surrounding environment, to know that the electronic device is being adjusted. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, obscuring the graphical representation of the exterior view of the body part that corresponds to the predefined portion of the user's body includes (818) fading out at least a portion of the graphical representation of the exterior view of the body part that corresponds to the predefined portion of the user's body. For example, in some embodiments, the obscuring comprises applying a vignette effect to the graphical representation by fading out (e.g., reducing the brightness and/or saturation) a peripheral portion of the graphical representation.

Following the above example, in some embodiments, as the user moves the HMD in another direction, such as up (e.g., as if the HMD will be placed on the user's forehead, above the user's eyes), the graphical representation is modified to apply a fade out visual effect on at least a portion of the graphical representation. For example, as the position of the HMD changes by the user moving the HMD upwards, the graphical representation of the user's eyes (e.g., and/or eyebrows) is faded.

Displaying a faded view of the representation of the portion of the user's body to indicate that the electronic device is moving with respect to the user's body provides an intuitive way for the user, and others in the surrounding environment who view the display, to know that the position of the electronic device is being adjusted relative to the user's body or relative to the predefined portion of the user's body. This improves the experience of interacting with wearable devices by decreasing the cognitive burden on the user, and others in the surrounding environment, to know that the electronic device is being adjusted. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, obscuring the graphical representation of the exterior view of the body part that corresponds to the predefined portion of the user's body includes (820) blurring at least a portion of the graphical representation of the exterior view of the body part that corresponds to the predefined portion of the user's body.

Following the above example, in some embodiments, as the user moves the HMD in another direction, such as to the left, the graphical representation is modified to apply a blurring effect on at least a portion of the graphical representation. For example, as the position of the HMD changes by the user moving the HMD to the left, the graphical representation of the user's eyes (e.g., and/or eyebrows) is blurred.

Displaying a blurred view of the representation of the portion of the user's body to indicate that the electronic device is moving relative to the user's body, or the predefined portion of the user's body, provides an intuitive way for the user, and others in the surrounding environment who view the display, to know that the electronic device is being adjusted relative to the user's body. This improves the experience of interacting with wearable devices by decreasing the cognitive burden on the user, and others in the surrounding environment, to know that the electronic device is being adjusted. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, obscuring the graphical representation of the exterior view of the body part that corresponds to the predefined portion of the user's body includes (822) vignetting the graphical representation of the exterior view of the body part that corresponds to the predefined portion of the user's body.

Following the above example, as the user moves the HMD to the right, the graphical representation is modified to apply a vignette effect on at least a portion of the graphical representation. For example, as the position of the HMD changes by the user moving the HMD to the right, the graphical representation of the user's eyes (e.g., and/or eyebrows) is displayed with a vignette effect, wherein the center of the graphical representation of the user's eyes appears in focus while the outer portions of the graphical representation of the user's eyes appear blurred, faded and/or less saturated (in color).

Displaying a vignette effect overlaid on the graphical representation of the predefined portion of the user's body to indicate that the electronic device is moving with respect to the user's body provides an intuitive way for the user, and others in the surrounding environment who view the display, to know that the electronic device is being adjusted relative to the user's body. This improves the experience of interacting with wearable devices by decreasing the cognitive burden on the user, and others in the surrounding environment, to know that the electronic device is being adjusted. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device, prior to the user wearing the electronic device, while the user is putting on the electronic device, displays (824) the graphical representation (e.g., as an animated graphical representation) of the exterior view of the body part that corresponds to the predefined portion of the user's body. In some embodiments, the display of the graphical representation is a modified version of (e.g., by applying a visual effect to) the graphical representation. For example, the graphical representation is darkened, blurred or appears to move (e.g., animate) as the device moves. In some embodiments, the electronic device determines that the user is putting on the electronic device in accordance with a determination that the electronic device is within a predefined distance of the predefined portion of the user's body, as explained below with reference to step 826.

In some embodiments, as the user puts on the HMD (e.g., into a predefined position (e.g., an in-use position, an operational position, or a proper position) on the user's head, the predefined position being designated as a position in which the representation of the physical feature is displayed with a respective appearance and is optionally a position in which the HMD functions as an AR or VR viewing device for viewing an AR or VR environment), the graphical representation of the user's eyes appears on the display generation component of the HMD. For example, the display generation component of the HMD displays a modified version of the graphical representation of the user's eyes (e.g., before the HMD has reached the predefined position on the user's head). For example, an obscured version (e.g., a darkened version) of the graphical representation of the user's eyes is displayed, to indicate that the HMD is still being adjusted (e.g., moved into the predefined position). In some embodiments, an animated version of the graphical representation of the user's eyes is displayed, such as displaying the graphical representation of the user's eyes as shifting eyes (e.g., eyes looking around) as the HMD changes position when the user is putting the HMD on the user's head.

Displaying a representation of the portion of the user's body that is currently hidden by the electronic device, as the electronic device is put into position on the user's body, provides an intuitive transition that shows the user, and others in the surrounding environment who view the display, that the electronic device is being placed onto the user's body and that the electronic device will continue updating the display to display a portion of the user's body that is covered by the electronic device. This improves the experience of interacting with wearable devices by decreasing the cognitive burden on the user, and others in the surrounding environment, to imagine what is under the electronic device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device, at a predefined distance away from the predefined portion of the user's body, initiates (826) display of the graphical representation of the exterior view of the body part that corresponds to the predefined portion of the user's body. For example, the electronic device does not display a graphical representation of the exterior view of the body part that corresponds to the predefined portion of the user's body until the electronic device is close (e.g., within 3 inches, or within 6 inches) to the predefined portion of the user's body. In some embodiments, the electronic device determines its distance away from the predefined portion of the user's body using one or more sensors (e.g., image sensors 404 (FIG. 4)).

In some embodiments, as the user puts on the HMD (e.g., into a predefined position on the user's head, the predefined position being designated as a position in which the representation of the physical feature is displayed with a respective appearance and is optionally a position in which the HMD functions as an AR or VR viewing device for viewing an AR or VR environment), the graphical representation of the user's eyes appears on the display generation component of the HMD only after the HMD is within a predefined distance away from the predefined position on the user's head (e.g., over the user's eyes). For example, the display generation component does not display the graphical representation of the user's eyes when the HMD is picked up by the user. As the user continues to move the HMD toward the user's eyes, in accordance with a determination that the HMD is close enough (e.g., within the predefined distance) to the user's eyes (e.g., at the predefined position), the display generation component begins displaying the graphical representation of the user's eyes (or a modified version of the graphical representation of the user's eyes, such as an obscured version, explained above).

Initiating display of the graphical representation of the portion of the user's body that is hidden by the electronic device, once the electronic device is close enough to the user's body, provides an intuitive transition that shows the user, and others in the surrounding environment who view the display, that the electronic device is close to the user's body and that the display will continue updating the display to display a portion of the user's body that is covered by the electronic device. This improves the experience of interacting with wearable devices by decreasing the cognitive burden on the user, and others in the surrounding environment, to imagine what is under the electronic device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device detects (828) a second change in position of the electronic device with respect to the predefined portion of the user's body, wherein the second change in the position of the electronic device is toward the predefined portion of the user's body. In some embodiments, the electronic device, in response to detecting the second change in the position of the electronic device with respect to the predefined portion of the user's body, gradually, over time or in accordance with progress of the change in position toward the predefined portion of the user's body, modifies the graphical representation of the exterior view of the body part that corresponds to the predefined portion of the user's body in accordance with the second change in the position of the electronic device with respect to the predefined portion of the user's body. In some embodiments, the graphical representation is initially displayed in an initial state in accordance with a determination that the electronic device is within a predefined distance from the portion of the user's body. In some embodiments, before reaching the predefined distance, the graphical representation is not displayed. For example, the display displays another user interface, is blank/darkened, or is off before displaying the graphical representation. As the user puts on the electronic device, the electronic device gradually transitions to displaying the graphical representation in a final state (e.g., the graphical representation of the predefined portion of the user's body) by blurring in, fading in, reducing vignetting, or decreasing the level of abstraction of the graphical representation as the user puts on the electronic device.

In some embodiments, as the user puts on the HMD (e.g., into a predefined position on the user's head, the predefined position being designated as a position in which the representation of the physical feature is displayed with a respective appearance and is optionally a position in which the HMD functions as an AR or VR viewing device for viewing an AR or VR environment), the graphical representation of the user's eyes gradually appears on the display generation component. For example, one or more visual effects are applied to the graphical representation, such as fading in the graphical representation, to become clearer (e.g., more in-focus) in accordance with the distance the HMD has moved. For example, the closer the HMD is moved to the predefined position, the more in-focus the graphical representation becomes. In this way, the graphical representation of the user's eyes appears modified (e.g., blurred, darkened, or otherwise obscured) until the HMD is placed into the predefined position, at which point the graphical representation of the user's eyes appears unmodified (e.g., in its neutral position, where the unmodified graphical representation of the user's eyes is displayed at a predefined brightness and a predefined amount of detail (and focus)).

Gradually updating display of the representation of the portion of the user's body to show more detail in the representation as the electronic device changes position relative to the user's body, provides an intuitive transition effect to indicate that the electronic device is moving closer to the user's body, which allows the user, and others in the surrounding environment who view the display, to know where the electronic device is located relative to the user's body, even as the device is being adjusted. This improves the experience of interacting with wearable devices by decreasing the cognitive burden on the user, and others in the surrounding environment, to imagine what is under the electronic device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently In some embodiments, modifying the graphical representation of the exterior view of the body part that corresponds to the predefined portion of the user's body in accordance with the second change in the position of the electronic device with respect to the predefined portion of the user's body includes (830) modifying (e.g., gradually) the graphical representation of the exterior view of the body part that corresponds to the predefined portion of the user's body to include graphical representations of a greater number of anatomical features as the electronic device is moved toward the predefined portion of the user's body. For example, the graphical representation becomes less abstract (e.g., more detailed) as the device is moved closer to the predefined portion of the user's body.

For example, as the user moves the HMD towards the user's eyes (e.g., moves the HMD inward, closer to the user's face), the graphical representation of the user's eyes gradually (e.g., as the HMD gets closer to the user's eyes) includes more detail. For example, the graphical representation displays additional features, such as a graphical representation the user's eyebrows (and/or graphical representations of other features related the user's eyes or of the user's face surrounding the user's eyes), in addition to the graphical representation of the user's eyes. In some embodiments, displaying a more detailed graphical representation comprises displaying an in-focus graphical representation (that is not blurred or faded). In some embodiments, the graphical representation is modified to become more detailed in proportion to the amount of movement (e.g., the distance moved) of the HMD relative to the user's eyes. For example, as the HMD is brought closer to the user's eyes, the graphical representation gradually becomes less obscured.

Gradually displaying a more detailed view of the representation of the user's body that shows more features on the display as the device moves closer to the user's body provides an intuitive way for the user, and others in the surrounding environment who view the display, to know that the electronic device is moving closer to the user's body, even when the user's body is covered and not visible to the user. This improves the experience of interacting with wearable devices by decreasing the cognitive burden on the user, and others in the surrounding environment, to imagine what is under the electronic device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, modifying the graphical representation of the exterior view of the body part that corresponds to the predefined portion of the user's body in accordance with the second change in the position of the electronic device with respect to the predefined portion of the user's body includes (832) fading in at least a portion of the graphical representation of the exterior view of the body part that corresponds to the predefined portion of the user's body.

Following the above example, in some embodiments, as the user moves the HMD in another direction, such as downward (e.g., as if the HMD is moved from the top of the user's head/forehead and is pulled down over the user's eyes) or toward the user's eyes (e.g., inward to be closer to the user's face), the graphical representation is modified to apply a fade in visual effect on at least a portion of the graphical representation. For example, as the position of the HMD changes by the user moving the HMD downwards and/or inwards, the graphical representation of the user's eyes (e.g., and/or eyebrows) is faded in (e.g., turns from a faded state to a non-faded state).

Providing a visual effect for fading in the view of the representation the portion of the user's body provides an intuitive way for the user, and others in the surrounding environment who view the display, to know that the electronic device is being adjusted relative to the user's body. This improves the experience of interacting with wearable devices by decreasing the cognitive burden on the user, and others in the surrounding environment, to know that the electronic device is being adjusted. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, modifying the graphical representation of the exterior view of the body part that corresponds to the predefined portion of the user's body in accordance with the second change in the position of the electronic device with respect to the predefined portion of the user's body includes (834) decreasing a blur of at least a portion of the graphical representation of the exterior view of the body part that corresponds to the predefined portion of the user's body.

Following the above example, in some embodiments, as the user moves the HMD in another direction (toward the user's eyes), such as to the right (e.g., as if the HMD was located to the left of the user's eyes and is moved rightward to be worn over the user's eyes), the graphical representation is modified to reduce the blurring visual effect on at least a portion of the graphical representation. For example, as the position of the HMD changes by the user moving the HMD to the right (and towards the user's eyes), the graphical representation of the user's eyes (e.g., and/or eyebrows) becomes less blurred (e.g., more in-focus).

Reducing the blur effect that is displayed over the representation of the portion of the user's body provides an intuitive way for the user, and others in the surrounding environment who view the display, to know that the electronic device is being adjusted relative to the user's body. This improves the experience of interacting with wearable devices by decreasing the cognitive burden on the user, and others in the surrounding environment, to know that the electronic device is being adjusted. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, modifying the graphical representation of the exterior view of the body part that corresponds to the predefined portion of the user's body in accordance with the second change in the position of the electronic device with respect to the predefined portion of the user's body includes (836) reducing a vignetting effect of the graphical representation of the exterior view of the body part that corresponds to the predefined portion of the user's body.

Following the above example, in some embodiments, as the user moves the HMD in another direction, such as to the left (e.g., as if the HMD was located to the right of the user's eyes and is moved leftward to be worn over the user's eyes), the graphical representation is modified to reduce the vignette effect on at least a portion of the graphical representation. For example, as the position of the HMD changes by the user moving the HMD to the right (and towards the user's eyes), the graphical representation of the user's eyes (e.g., and/or eyebrows) is displayed with a reduced vignette effect (e.g., the vignette/blur applied to the outer portions of the display of the graphical representation is removed so that the entire graphical representation is displayed in-focus).

Reducing the vignette effect that is displayed over the representation of the portion of the user's body provides an intuitive way for the user, and others in the surrounding environment who view the display, to know that the electronic device is being adjusted relative to the user's body. This improves the experience of interacting with wearable devices by decreasing the cognitive burden on the user, and others in the surrounding environment, to know that the electronic device is being adjusted. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In the examples given above, the movements of the HMD are defined by a direction of the movement (up, down, left, right) relative to the user's eyes. For example, in the examples associated with steps 816-822, the direction of the movements that are associated with a particular effect are generated from a movement in the opposite direction than in the examples associated with steps 830-836 for that particular effect. This is because when the HMD is moved to the left, away from the user's eyes, a more obscured graphical representation is displayed, while a movement of the HMD to the right, towards the user's eyes (and back to the HMD's neutral position) will generate a less obscured graphical representation. Thus, the obscured graphical representation becomes more obscured as the HMD moves away from the user's eyes (whether that is in a direction up, down, left or right, as described in steps 816-822), and the obscured graphical representation becomes less obscured (e.g., clearer and more in-focus) as the HMD moves towards the user's eyes (e.g., as described in steps 830-836). The graphical representation of the user's eyes is considered unmodified (e.g., clear and in-focus) when the HMD is worn in the predefined position over the user's eyes. The graphical representation of the user's eyes is obscured using any visual effect or combination of visual effect when the HMD is moved away from its neutral position.

In some embodiments, the predefined portion of the user's body comprises (838) the user's eyes (e.g., two eyes). As explained in the above examples, in some embodiments, the electronic device is a headset, or HMD, configured to be worn over the user's eyes, and the electronic device generates a graphical representation of the user's eyes for display on the display generation component that is located on a side or surface of the electronic device opposite the side of the device closest to the predefined portion of the user's body (e.g., facing away from the body).

Displaying a representation of the user's eyes when the user's eyes are covered by the electronic device provides a more intuitive interaction between others, who are viewing the display without the ability to see the user's eyes. By displaying a graphical representation of the user's eyes to the others, the interactions between the others and the user is improved by allowing the others to feel more engaged with the user. Allowing the others to view a graphical representation of the user's eyes makes the others feel more at ease with interacting with the user wearing the device. Providing improved visual feedback to the user, and others, enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the detected change in position of the electronic device with respect to the predefined portion of the user's body is (840) a first change in position of the electronic device with respect to the predefined portion of the user's body. In some embodiments, the electronic device detects a second change in the position of the electronic device with respect to the predefined portion of the user's body, wherein the second change in the position of the electronic device with respect to the predefined portion of the user's body is opposite the first change. In some embodiments, the electronic device, in response to the second change in the position of the electronic device with respect to the predefined portion of the user's body, reverses, over a period of time or in accordance with progress of the second change in position away from the predefined portion of the user's body, (e.g., gradually reverses) the modification of the graphical representation of the exterior view of the body part that corresponds to the predefined portion of the user's body. For example, the first change in position comprises taking the electronic device off of the user's body (e.g., moving the electronic device away from the user's body) and the second change in position comprises putting the electronic device on the user's body (e.g., moving the electronic device towards the user's body). In some embodiments, the visual effect applied to the graphical representation of the predefined portion of the user's body is reversed between the two (opposite) changes in position. For example, as the device is taken off of the user's body, the modification comprises gradually abstracting out (to provide less detail of) the graphical representation of the user's body. As the device is then put onto the user's body, the modification comprises gradually adding more detail to the graphical representation of the user's body.

In some embodiments, a gesture (or sequence of gestures) to adjust the position of the electronic device includes multiple components, including one or more components comprising moving the electronic device toward the user's body and one or more components comprising moving the electronic device away from the user's body. As the multiple components of the gesture alternate between the type of movements, the modifications to the graphical representation are transitioned smoothly (e.g., fluidly). For example, the electronic device smoothly transitions between increasing the modification of (e.g., the level of abstraction of) the graphical representation of the exterior view of the body part (as the electronic device is moved away from the predefined portion of the body) and decreasing the modification of the graphical representation of the exterior view of the body part (as the device is moved toward the predefined portion of the user's body), in accordance with the movement in position of the electronic device.

The multiple components of the gesture to adjust the position of the electronic device may include, for example, two or more of the following: adjustments to a vertical alignment of the electronic device with the predefined portion of the user's body, adjustments to a horizontal alignment of the electronic device with the predefined portion of the user's body, adjustments to a distance between the electronic device and the predefined portion of the user's body, and adjustments to the orientation (e.g., tilt with respect to vertical and/or horizontal axes) of the electronic device relative to the predefined portion of the user's body. Furthermore, in some embodiments, for each distinct component of the multiple components, a corresponding modification to the graphical representation is smoothly transitioned as that component of the gesture changes over time. Thus, different concurrent components of the gesture may result in concurrent transitions in different types of modifications of the graphical representation, such as, without limitation, fading, blurring, abstraction, or vignetting.

For example, after the user has moved the HMD in a first direction relative to the user's eyes, the user subsequently moves the HMD in the opposite direction. For example, the user repositions the HMD by moving the HMD upwards (e.g., over the user's forehead), which causes the graphical representation of the user's eyes to be obscured (e.g., blurred, faded, vignette, etc.), and, after the user has repositioned the HMD upwards, the user moves the HMD downwards (e.g., back into position over the user's eyes), which causes the graphical representation of the user's eyes to be modified in the opposite way (e.g., become less obscured) by undoing the modification to the graphical representation. In this way, the graphical representation is dynamically modified such that as the HMD is repositioned away from the user's eyes, the graphical representation becomes more obscured using one or more visual effects, and as the HMD is repositioned into the predefined position over the user's eyes, the graphical representation returns to its unmodified state (e.g., where, in the unmodified state, the graphical representation is an unobscured representation of the user's eyes).

Generating different modifications to the representation of the user's body such that the modifications appear to be increased or decreased based on the direction (or type) of movement of the electronic device creates an intuitive way for a user to be aware of how the device is moving based on the modification that is displayed. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device, in accordance with a determination that the change in position of the electronic device with respect to the predefined portion of the user's body is along a first direction, modifies (842) the graphical representation in a first manner. For example, the change in position of the electronic device comprises moving the device away from the predefined portion of the user's body (e.g., shifting the device to pull away from the user's eyes), and the modification includes a visual effect applied to the graphical representation, such as blurring, applying a vignette, and/or changing a position (z-height) of the predefined portion of the user's body (e.g., the user's eyes) on the display.

In some embodiments, the electronic device, in accordance with a determination that the change in position of the electronic device with respect to the predefined portion of the user's body is along a second direction, wherein the second direction is distinct from (e.g., not parallel to) the first direction, modifies the graphical representation in a second manner, different from the first manner. In some embodiments, the second direction is defined along a third axis that is distinct from the first direction (along a first axis). In this way, the visual effect that is applied to the graphical representation is dependent on how the electronic device is moved. For example, tilting the electronic device produces a first visual effect, moving the electronic device toward (or away from) the user's body produces a second visual effect (distinct from the first effect), shifting the electronic device up or down (e.g., along a y-axis) produces a third visual effect (distinct from the first and second visual effects), and removing the electronic device from the predefined portion of the user's body produces a fourth visual effect.

For example, when the user moves the HMD by tilting the HMD (e.g., moving a left side of the HMD up while moving a right side of the HMD down), the graphical representation is modified using a first visual effect, such as fading the graphical representation of the user's eyes. When the user pulls the HMD away from the user's eyes (e.g., forward), the graphical representation is modified using a second visual effect, distinct from the first visual effect, such as blurring the graphical representation of the user's eyes. When the user moves the HMD up or down (e.g., to place the HMD over the user's forehead or nose), the graphical representation is modified using a third visual effect, distinct from the first visual effect and the second visual effect, such as reducing the number of features displayed in the graphical representation (e.g., showing the graphical representation of the user's eyebrows without showing the graphical representation of the user's eyes). When the user removes the HMD from the user's head, the graphical representation is modified using a fourth visual effect, such as darkening the graphical representation (e.g., gradually) until the graphical representation is no longer displayed. The association between which visual effects are associated with a particular change in position are for exemplary purposes only. It will be understood that a first change in position (e.g., in a first direction) can be associated with any of the one or more visual effects described herein.

Applying different visual effects to the representation of the user's body based how the position of the electronic device is changing, such that each visual effect reflects a different adjustment to the position of the electronic device, creates an intuitive way for a user to be aware of how the device is moving based on the visual effect that is displayed. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device, in accordance with a determination that the change in position of the electronic device with respect to the predefined portion of the user's body has a component along the first direction and a component along the second direction, modifies (844) the graphical representation in the first manner based on the component along the first direction and modifies the graphical representation in the second manner based on the component along the second direction. In some embodiments, the modifying in the first manner and the modifying in the second manner occur gradually, as described above, and occur concurrently (e.g., both modifications are applied at the same time). For example, as the user removes the electronic device (e.g., headset) from the user's head, there is a change in position in at least two directions: away from the user's body and moving down on the user's body. In this example, both visual effects are displayed as the user removes the electronic device, for example both shifting the user's eyes (to reflect the change in position down the user's body) and blurring the user's eyes (to reflect the change in position away from the user's body) as the headset is removed from the user's head.

In some embodiments, the user moves the HMD in a plurality of directions at the same time (e.g., within the same motion). In response to the user's movement in the plurality of directions, the visual effect that is associated with each of the directions of movement are applied to the graphical representation of the user's eyes concurrently. For example, if the user pulls the HMD forward, away from the user's eyes, and moves the HMD in the upward direction, away from the user's eyes, the graphical representation of the user's eyes is blurred (e.g., in proportion to the amount of movement in pulling the HMD away) and the number of features displayed in the graphical representation is reduced (e.g., in proportion to the amount of movement of the HMD in the upward direction). In some embodiments, other combinations of movements that result in a change in position (e.g., along multiple axes) of the HMD generates a corresponding combination of visual effects that are simultaneously applied to the graphical representation of the user's eyes.

Combining different visual effects to the representation of the user's body based how the position of the electronic device is changing, such that the combination of visual effect reflects different types of adjustments to the position of the electronic device at the same time, creates an intuitive way for a user to be aware of how the device is moving based on the combination of visual effects that is displayed. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device, in accordance with a determination that the change in position of the electronic device with respect to the predefined portion of the user's body is a rotation of the electronic device with respect to the predefined portion of the user's body, modifies (846) the graphical representation in a third manner. In some embodiments, detecting a rotation of the electronic device with respect to the predefined portion of the user's body comprises detecting an adjustment of position of the electronic device relative to the user's body. For example, in FIG. 7E, as device 700 is rotated to twist the band around the user's arm, display 712 modifies the graphical representation of the animation using a modification (a third manner) distinct from the modification displayed when device 700 is moved toward or away from the user's wrist (e.g., as shown in FIGS. 7C-7D) and distinct from the modification displayed when device 700 is moved away from the arm (e.g., as shown in FIGS. 7G-7H). In some embodiments, a different modification (e.g., visual effect) is displayed when the change in position is along a different axis.

In the following example, the axes are defined as follows (with respect to a user's eyes as the predefined portion of the user's body): the x-axis refers to the movement forward or backward (e.g., away from or closer to the eyes), the y-axis refers to movement up or down (e.g., above or below the eyes), and the z-axis refers to movement to the left and right. For example, a tilt of device (e.g., moving up or down with reference to the y-axis) causes a different visual effect than a twist (rotation) of the electronic device (e.g., movement along the z-axis), and a different visual effect than a push or pull movement (e.g., moving forward or backward along the x-axis). In some embodiments, a tilt of the electronic device corresponds (e.g., causes the electronic device to produce) to a visual effect that turns off or dims the display, and shows eyebrows instead of eyes. In some embodiments, a twist of the electronic device corresponds to (e.g., causes the electronic device to produce) a visual effect of shifting the representation of the portion of the user's body on the display such that the representation matches the location of the portion of the user's body (e.g., the position of the graphical representations of the user's eyes are shifted to match up with the user's real eyes). For example, when the user moves the HMD by tilting the HMD (e.g., moving a left side of the HMD up while moving a right side of the HMD down), the graphical representation of the user's eyes is dimmed (or darkened). When the user twists the HMD (e.g., by moving the HMD to the right or left, along the z-axis), the graphical representation is modified by changing a location of the graphical representation of the user's eyes on the display. For example, the graphical representation of the user's eyes is moved on the display, such that the position of the graphical representation of the user's eyes remains at a position corresponding to the user's real eyes that are covered by the display.

Differentiating between multiple visual effects based on the type (or direction) of movement that causes the change in position of the electronic device, creates an intuitive way for a user to be aware of how the device is moving based on which visual effect is displayed. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, modifying the graphical representation in the first manner includes displaying, via the display generation component, an overlay that obscures at least a portion of the graphical representation of the exterior view of the body part that corresponds to the predefined portion of the user's body. For example, while the position of the electronic device is changed (e.g., as the user adjusts the position of the electronic device), displaying the overlay includes showing the graphical representation of the exterior view of the body part in flux, such as blurred, faded, or dimmed, to indicate that the user is adjusting the position of the electronic device. In some embodiments, the overlay comprises showing text or an emoji over at least a portion of the graphical representation of the exterior view of the body part that corresponds to the predefined portion of the user's body.

For example, in some embodiments, in response to the user changing the position of the HMD (e.g., adjusting the HMD on the user's head), an overlay is displayed over the graphical representation of the user's eyes to indicate (e.g., to the third party looking at the display) that the user is adjusting the HMD. In some embodiments, the graphical representation of the user's eyes is animated such that the user's eyes appear closed.

In some embodiments, the electronic device detects a trigger (e.g., an input) at the electronic device (e.g., with or without detecting a change in the position of the electronic device with respect to the predefined portion of the user's body). In some embodiments, the trigger comprises an input selected from the group consisting of an input detected in front of the display generation component of the electronic device (e.g., a hand detected in front of face (in front of the electronic device while the electronic device is on the user's face)), an input selecting a physical control (e.g., button) of the electronic device, and an input detected on an edge of the electronic device.

In some embodiments, the electronic device, in response to detecting the trigger, modifies the graphical representation of the exterior view of the predefined portion of the user's body in accordance with the detected trigger, including displaying, via the display generation component, the overlay that obscures at least a portion of the graphical representation of the exterior view of the body part that corresponds to the predefined portion of the user's body. For example, the trigger is a trigger to pause a current session, and in response to the trigger, the electronic device displays an overlay over at least a portion of the graphical representation displayed at the display generation component of the electronic device to indicate that the current session is paused.

For example, in response to the user putting a hand in front of the HMD worn on the user's head, the graphical representation of the user's eyes is obscured on the display (e.g., with an overlay placed over the graphical representation of the user's eyes). In some embodiments, the obscured graphical representation of the user's eyes indicates, to the third party that views the display generation component, that the user is not currently engaging with the third party (e.g., the user's session with the third party is paused).

In some embodiments, the graphical representation of the exterior view of the body part that corresponds to the predefined portion of the user's body moves as the corresponding portion of the user's body moves when the device is worn over the predefined portion of the user. For example, a graphical representation of eyes moves, so as to look around and/or open/close based on movement and opening/closing of the user's eyes, as detected by a camera or other biometric sensor of, or in communication with, the electronic device.

It should be understood that the particular order in which the operations in FIGS. 8A-8D have been described is merely an example and is not intended to indicate that the described order is the only order in which the operations could be performed. One of ordinary skill in the art would recognize various ways to reorder the operations described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at an electronic device configured to be worn over a predefined portion of a user's body, the electronic device having one or more processors, memory, and a display generation component arranged on the electronic device opposite the predefined portion of the user's body:
   while the electronic device is worn over the predefined portion of the user's body, displaying, via the display generation component, a graphical representation of an exterior view of a body part that corresponds to the predefined portion of the user's body;
   detecting a trigger at the electronic device, wherein the trigger comprises an input selected from the group consisting of an input detected in front of the display generation component of the electronic device, an input selecting a physical control of the electronic device, and an input detected on an edge of the electronic device; and
   in response to detecting the trigger, modifying the graphical representation of the exterior view of the body part that corresponds to the predefined portion of the user's body in accordance with the detected trigger, including obscuring a portion of the graphical representation of the exterior view of the body part that corresponds to the predefined portion of the user's body.

2. The method of claim 1, wherein detecting the trigger at the electronic device is performed without detecting a change in position of the electronic device with respect to the predefined portion of the user's body.

3. The method of claim 1, wherein detecting the trigger at the electronic device comprises detecting a hand covering a portion of the electronic device.

4. The method of claim 1, wherein detecting the trigger at the electronic device comprises detecting a user input to pause a current session of the electronic device.

5. The method of claim 1, wherein detecting the trigger at the electronic device comprises detecting a user input on the edge of the electronic device.

6. The method of claim 1, including:
   detecting a first change in position of the electronic device with respect to the predefined portion of the user's body; and
   in response to detecting the first change in the position of the electronic device with respect to the predefined portion of the user's body, modifying the graphical representation of the exterior view of the body part that corresponds to the predefined portion of the user's body in accordance with the detected first change in the position of the electronic device with respect to the predefined portion of the user's body.

7. The method of claim 6, wherein detecting the first change in the position of the electronic device with respect to the predefined portion of the user's body includes detecting movement of the electronic device away from a respective position of the electronic device relative to the predefined portion of the user's body; and
   modifying the graphical representation in accordance with the detected first change in position of the electronic device with respect to the predefined portion of the user's body includes gradually obscuring one or more features of the graphical representation of the exterior view of the body part as the position of the electronic device changes relative to the respective position of the electronic device.

8. The method of claim 7, wherein modifying the graphical representation in accordance with the detected first change in position of the electronic device with respect to the predefined portion of the user's body includes:
at a predefined distance away from the predefined portion of the user's body, ceasing display of at least a portion of the graphical representation of the exterior view of the body part that corresponds to the predefined portion of the user's body.

9. The method of claim 1, wherein obscuring the portion of the graphical representation of the exterior view of the body part that corresponds to the predefined portion of the user's body includes fading out at least a portion of the graphical representation of the exterior view of the body part that corresponds to the predefined portion of the user's body.

10. The method of claim 1, wherein obscuring the portion of the graphical representation of the exterior view of the body part that corresponds to the predefined portion of the user's body includes blurring at least a portion of the graphical representation of the exterior view of the body part that corresponds to the predefined portion of the user's body.

11. The method of claim 1, wherein obscuring the portion of the graphical representation of the exterior view of the body part that corresponds to the predefined portion of the user's body includes vignetting the graphical representation of the exterior view of the body part that corresponds to the predefined portion of the user's body.

12. The method of claim 1, wherein obscuring the portion of the graphical representation of the exterior view of the body part that corresponds to the predefined portion of the user's body includes displaying an overlay that obscures at least a portion of the graphical representation of the exterior view of the body part that corresponds to the predefined portion of the user's body.

13. The method of claim 1, wherein obscuring the portion of the graphical representation of the exterior view of the body part that corresponds to the predefined portion of the user's body includes displaying text over at least a portion of the graphical representation of the exterior view of the body part that corresponds to the predefined portion of the user's body.

14. The method of claim 1, wherein obscuring the portion of the graphical representation of the exterior view of the body part that corresponds to the predefined portion of the user's body includes displaying an emoji over at least a portion of the graphical representation of the exterior view of the body part that corresponds to the predefined portion of the user's body.

15. The method of claim 1, including:
detecting a second change in position of the electronic device with respect to the predefined portion of the user's body, wherein the second change in the position of the electronic device changes the position of the electronic device relative to the predefined portion of the user's body; and
in response to detecting the second change in the position of the electronic device with respect to the predefined portion of the user's body, displaying an overlay that indicates the user is adjusting the electronic device.

16. The method of claim 1, wherein the predefined portion of the user's body comprises two eyes.

17. An electronic device, comprising:
a display generation component arranged on the electronic device opposite a predefined portion of a user's body;
one or more input devices;
one or more processors; and
memory storing one or more programs, wherein the one or more programs are configured to be executed by the one or more processors, the one or more programs including instructions for:
while the electronic device is worn over the predefined portion of the user's body, displaying, via the display generation component, a graphical representation of an exterior view of a body part that corresponds to the predefined portion of the user's body;
detecting a trigger at the electronic device, wherein the trigger comprises an input selected from the group consisting of an input detected in front of the display generation component of the electronic device, an input selecting a physical control of the electronic device, and an input detected on an edge of the electronic device; and
in response to detecting the trigger, modifying the graphical representation of the exterior view of the body part that corresponds to the predefined portion of the user's body in accordance with the detected trigger, including obscuring a portion of the graphical representation of the exterior view of the body part that corresponds to the predefined portion of the user's body.

18. The electronic device of claim 17, the one or more programs further comprising instructions for:
detecting a first change in position of the electronic device with respect to the predefined portion of the user's body; and
in response to detecting the first change in the position of the electronic device with respect to the predefined portion of the user's body, modifying the graphical representation of the exterior view of the body part that corresponds to the predefined portion of the user's body in accordance with the detected first change in the position of the electronic device with respect to the predefined portion of the user's body.

19. The electronic device of claim 18, wherein detecting the first change in the position of the electronic device with respect to the predefined portion of the user's body includes detecting movement of the electronic device away from a respective position of the electronic device relative to the predefined portion of the user's body; and
modifying the graphical representation in accordance with the detected first change in position of the electronic device with respect to the predefined portion of the user's body includes gradually obscuring one or more features of the graphical representation of the exterior view of the body part as the position of the electronic device changes relative to the respective position of the electronic device.

20. The electronic device of claim 19, wherein modifying the graphical representation in accordance with the detected first change in position of the electronic device with respect to the predefined portion of the user's body includes:
at a predefined distance away from the predefined portion of the user's body, ceasing display of at least a portion of the graphical representation of the exterior view of the body part that corresponds to the predefined portion of the user's body.

21. The electronic device of claim 17, wherein obscuring the portion of the graphical representation of the exterior view of the body part that corresponds to the predefined portion of the user's body includes fading out at least a portion of the graphical representation of the exterior view of the body part that corresponds to the predefined portion of the user's body.

22. The electronic device of claim 17, wherein obscuring the portion of the graphical representation of the exterior view of the body part that corresponds to the predefined portion of the user's body includes blurring at least a portion of the graphical representation of the exterior view of the body part that corresponds to the predefined portion of the user's body.

23. The electronic device of claim 17, wherein obscuring the portion of the graphical representation of the exterior view of the body part that corresponds to the predefined portion of the user's body includes vignetting the graphical representation of the exterior view of the body part that corresponds to the predefined portion of the user's body.

24. The electronic device of claim 17, wherein obscuring the portion of the graphical representation of the exterior view of the body part that corresponds to the predefined portion of the user's body includes displaying an overlay that obscures at least a portion of the graphical representation of the exterior view of the body part that corresponds to the predefined portion of the user's body.

25. The electronic device of claim 17, wherein obscuring the portion of the graphical representation of the exterior view of the body part that corresponds to the predefined portion of the user's body includes displaying text over at least a portion of the graphical representation of the exterior view of the body part that corresponds to the predefined portion of the user's body.

26. The electronic device of claim 17, wherein obscuring the portion of the graphical representation of the exterior view of the body part that corresponds to the predefined portion of the user's body includes displaying an emoji over at least a portion of the graphical representation of the exterior view of the body part that corresponds to the predefined portion of the user's body.

27. The electronic device of claim 17, the one or more programs further comprising instructions for:
   detecting a second change in position of the electronic device with respect to the predefined portion of the user's body, wherein the second change in the position of the electronic device changes the position of the electronic device relative to the predefined portion of the user's body; and
   in response to detecting the second change in the position of the electronic device with respect to the predefined portion of the user's body, displaying an overlay that indicates the user is adjusting the electronic device.

28. The electronic device of claim 17, wherein the predefined portion of the user's body comprises two eyes.

29. A non-transitory computer readable storage medium storing one or more programs, the one or more programs comprising instructions that, when executed by an electronic device that includes and/or is in communication with a display generation component arranged on the electronic device opposite a predefined portion of a user's body, and one or more input devices, cause the electronic device to:
   while the electronic device is worn over the predefined portion of the user's body, display, via the display generation component, a graphical representation of an exterior view of a body part that corresponds to the predefined portion of the user's body;
   detect a trigger at the electronic device, wherein the trigger comprises an input selected from the group consisting of an input detected in front of the display generation component of the electronic device, an input selecting a physical control of the electronic device, and an input detected on an edge of the electronic device; and
   in response to detecting the trigger, modify the graphical representation of the exterior view of the body part that corresponds to the predefined portion of the user's body in accordance with the detected trigger, including obscuring a portion of the graphical representation of the exterior view of the body part that corresponds to the predefined portion of the user's body.

30. The non-transitory computer readable storage medium of claim 29, wherein detecting the trigger at the electronic device is performed without detecting a change in position of the electronic device with respect to the predefined portion of the user's body.

31. The non-transitory computer readable storage medium of claim 29, wherein detecting the trigger at the electronic device comprises detecting a hand covering a portion of the electronic device.

32. The non-transitory computer readable storage medium of claim 29, wherein detecting the trigger at the electronic device comprises detecting a user input to pause a current session of the electronic device.

33. The non-transitory computer readable storage medium of claim 29, wherein detecting the trigger at the electronic device comprises detecting a user input on the edge of the electronic device.

34. The non-transitory computer readable storage medium of claim 29, the one or more programs further comprising instructions that when executed by the electronic device cause the electronic device to:
   detect a first change in position of the electronic device with respect to the predefined portion of the user's body; and
   in response to detecting the first change in the position of the electronic device with respect to the predefined portion of the user's body, modify the graphical representation of the exterior view of the body part that corresponds to the predefined portion of the user's body in accordance with the detected first change in the position of the electronic device with respect to the predefined portion of the user's body.

35. The non-transitory computer readable storage medium of claim 34, wherein detecting the first change in the position of the electronic device with respect to the predefined portion of the user's body includes detecting movement of the electronic device away from a respective position of the electronic device relative to the predefined portion of the user's body; and
   modifying the graphical representation in accordance with the detected first change in position of the electronic device with respect to the predefined portion of the user's body includes gradually obscuring one or more features of the graphical representation of the exterior view of the body part as the position of the electronic device changes relative to the respective position of the electronic device.

36. The non-transitory computer readable storage medium of claim 35, wherein modifying the graphical representation in accordance with the detected first change in position of the electronic device with respect to the predefined portion of the user's body includes:
   at a predefined distance away from the predefined portion of the user's body, ceasing display of at least a portion of the graphical representation of the exterior view of the body part that corresponds to the predefined portion of the user's body.

37. The non-transitory computer readable storage medium of claim 29, wherein obscuring the portion of the graphical representation of the exterior view of the body part that corresponds to the predefined portion of the user's body includes fading out at least a portion of the graphical representation of the exterior view of the body part that corresponds to the predefined portion of the user's body.

38. The non-transitory computer readable storage medium of claim 29, wherein obscuring the portion of the graphical representation of the exterior view of the body part that corresponds to the predefined portion of the user's body includes blurring at least a portion of the graphical representation of the exterior view of the body part that corresponds to the predefined portion of the user's body.

39. The non-transitory computer readable storage medium of claim 29, wherein obscuring the portion of the graphical representation of the exterior view of the body part that corresponds to the predefined portion of the user's body includes vignetting the graphical representation of the exterior view of the body part that corresponds to the predefined portion of the user's body.

40. The non-transitory computer readable storage medium of claim 29, wherein obscuring the portion of the graphical representation of the exterior view of the body part that corresponds to the predefined portion of the user's body includes displaying an overlay that obscures at least a portion of the graphical representation of the exterior view of the body part that corresponds to the predefined portion of the user's body.

41. The non-transitory computer readable storage medium of claim 29, wherein obscuring the portion of the graphical representation of the exterior view of the body part that corresponds to the predefined portion of the user's body includes displaying text over at least a portion of the graphical representation of the exterior view of the body part that corresponds to the predefined portion of the user's body.

42. The non-transitory computer readable storage medium of claim 29, wherein obscuring the portion of the graphical representation of the exterior view of the body part that corresponds to the predefined portion of the user's body includes displaying an emoji over at least a portion of the graphical representation of the exterior view of the body part that corresponds to the predefined portion of the user's body.

43. The non-transitory computer readable storage medium of claim 29, the one or more programs further comprising instructions that when executed by the electronic device cause the electronic device to:
    detect a second change in position of the electronic device with respect to the predefined portion of the user's body, wherein the second change in the position of the electronic device changes the position of the electronic device relative to the predefined portion of the user's body; and
    in response to detecting the second change in the position of the electronic device with respect to the predefined portion of the user's body, display an overlay that indicates the user is adjusting the electronic device.

44. The non-transitory computer readable storage medium of claim 29, wherein the predefined portion of the user's body comprises two eyes.

45. The electronic device of claim 17, wherein detecting the trigger at the electronic device comprises detecting a user input to pause a current session of the electronic device.

46. The electronic device of claim 17, wherein detecting the trigger at the electronic device comprises detecting a user input on the edge of the electronic device.

* * * * *